US012373155B2

(12) United States Patent
Wang et al.

(10) Patent No.: US 12,373,155 B2
(45) Date of Patent: Jul. 29, 2025

(54) MULTI-DEVICE-BASED ONLINE INTERACTION METHOD, CHIP, ELECTRONIC DEVICE, AND STORAGE MEDIUM

(71) Applicant: HUAWEI TECHNOLOGIES CO., LTD., Guangdong (CN)

(72) Inventors: Yongde Wang, Shenzhen (CN); Siyuan Jing, Shenzhen (CN); Jian Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/282,038

(22) PCT Filed: Mar. 8, 2022

(86) PCT No.: PCT/CN2022/079770
§ 371 (c)(1),
(2) Date: Sep. 14, 2023

(87) PCT Pub. No.: WO2022/193994
PCT Pub. Date: Sep. 22, 2022

(65) Prior Publication Data
US 2024/0152310 A1 May 9, 2024

(30) Foreign Application Priority Data

Mar. 15, 2021 (CN) ........................ 202110275341.X

(51) Int. Cl.
*G06F 3/14* (2006.01)
*G06F 3/0484* (2022.01)

(52) U.S. Cl.
CPC .......... *G06F 3/1454* (2013.01); *G06F 3/0484* (2013.01); *G06F 3/1423* (2013.01)

(58) Field of Classification Search
CPC ..... G06F 3/1454; G06F 3/0484; G06F 3/1423
(Continued)

(56) References Cited

U.S. PATENT DOCUMENTS 11,128,636 B1 * 9/2021 Jorasch ................ H04W 12/33
2011/0239142 A1 * 9/2011 Steeves .................... G06F 3/14
345/3.1
(Continued)

FOREIGN PATENT DOCUMENTS

CA    2848637 A1 * 12/2012  ........... G06F 16/335
CA    2908662 A1 * 10/2014  ......... H04L 65/1066
(Continued)

OTHER PUBLICATIONS

U.S. Appl. No. 63/023,965 "Systems Methods and Apparatus for Enhanced Headsets" (Year: 2020).*

*Primary Examiner* — Kwin Xie
(74) *Attorney, Agent, or Firm* — WOMBLE BOND DICKINSON (US) LLP

(57) ABSTRACT

Embodiments of this application provide a multi-device-based online interaction method, and relate to the field of terminals. A first electronic device starts a first application to play first playing content. When the first electronic device receives a control instruction for hopping the first playing content of the first application to a second electronic device, the first electronic device sends a hopping message to the second electronic device. When the second electronic device receives the hopping message, the second electronic device continues to play the first playing content. In response to a control starting instruction transmitted by a content provider server, the first electronic device starts an interaction control. The first electronic device obtains interaction information of the interaction control, and sends the interaction information to the content provider server.

21 Claims, 23 Drawing Sheets

(58) Field of Classification Search
USPC ......................................................... 345/2.3
See application file for complete search history.

(56) References Cited

U.S. PATENT DOCUMENTS

| | | | | |
|---|---|---|---|---|
| 2015/0077326 A1* | 3/2015 | Kramer | ................. | G06F 3/0346 |
| | | | | 345/156 |
| 2021/0234909 A1* | 7/2021 | Shortt | .............. | H04N 21/26258 |
| 2021/0342020 A1* | 11/2021 | Jorasch | ................... | G06F 3/011 |

FOREIGN PATENT DOCUMENTS

| | | | | | |
|---|---|---|---|---|---|
| CN | 108769814 | A | | 11/2018 | |
| CN | 110109636 | A | | 8/2019 | |
| CN | 111309279 | A | | 6/2020 | |
| CN | 111435999 | A | | 7/2020 | |
| CN | 111901674 | A | | 11/2020 | |
| CN | 112732212 | A | | 4/2021 | |
| CN | 113835649 | A | | 12/2021 | |
| CN | 114171066 | A | * | 3/2022 | ............. A47B 81/06 |
| EP | 2061230 | A2 | | 5/2009 | |
| EP | 3089466 | A1 | | 11/2016 | |

\* cited by examiner

MULTI-DEVICE-BASED ONLINE INTERACTION METHOD, CHIP, ELECTRONIC DEVICE, AND STORAGE MEDIUM

This application is a national stage of International Application No. PCT/CN2022/079770, filed on Mar. 8, 2022, which claims priority to Chinese Patent Application No. 202110275341.X, filed on Mar. 15, 2021. Both of the aforementioned applications are hereby incorporated by reference in their entireties.

TECHNICAL FIELD

This application relates to the field of terminals, and in particular, to a multi-device-based online interaction method, a chip, an electronic device, and a computer-readable storage medium.

BACKGROUND

Online learning breaks time and space restrictions of a traditional classroom and makes cross-area learning, long-distance communication, and personalized teaching more convenient. However, in comparison with offline teaching, actual online learning experience has a series of problems, such as insufficient interaction in a teaching process, a small screen of an online course terminal device, and a vision loss due to short line of sight. As a result, an actual effect of the online learning is poor.

Usually, in multi-device collaboration in an existing online course learning solution, content displayed on a handheld terminal such as a tablet or a mobile phone is simply put on a large screen by using the digital living network alliance (DLNA) protocol or the Miracast protocol. The two devices display the same content, a screen of the handheld terminal and the large screen are not effectively combined to give full play to respective advantages, and a pain point of weak interaction of a user during an online course is not resolved.

SUMMARY

In view of this, it is necessary to provide a multi-device-based online interaction method, which can effectively combine a small-screen device and a large-screen device, and implement large-screen playing and small-screen interaction.

A first aspect of embodiments of this application discloses a multi-device-based online interaction method, including: A first electronic device starts a first application. The first electronic device plays first playing content by using the first application. When the first electronic device receives a control instruction for hopping the first playing content of the first application to a second electronic device, the first electronic device sends a hopping message to the second electronic device, so that the second electronic device continues to play the first playing content. The first electronic device receives a control starting instruction transmitted by a content provider server or the second electronic device. In response to the control starting instruction, the first electronic device starts an interaction control. The first electronic device obtains interaction information of the interaction control, and sends the interaction information to the content provider server.

By using the technical solution, the first playing content may be hopped between the first electronic device and the second electronic device for playing, and interaction may be performed by using the first electronic device. The interaction information may be sent to the content provider server by using the first electronic device.

In one embodiment, the online interaction method further includes: When the first electronic device receives a hopping success message sent by the second electronic device, the first electronic device stops playing the first playing content.

By using the technical solution, when the first playing content is successfully hopped to the second electronic device for playing, the first electronic device may stop playing the first playing content.

In one embodiment, the online interaction method further includes: When the first electronic device receives a control instruction for stopping hopping the first playing content, the first electronic device sends a stop message to the second electronic device.

By using the technical solution, the first playing content may be hopped from the second electronic device back to the first electronic device for playing.

In one embodiment, the online interaction method further includes: When the first electronic device receives a hopping stop message sent by the second electronic device, the first electronic device continues to play the first playing content.

By using the technical solution, when the first playing content is hopped back to the first electronic device for playing, the first electronic device may continue a playing progress in the second electronic device to play the first playing content.

In one embodiment, the online interaction method further includes: The first electronic device sends a device control instruction to the second electronic device, to control the second electronic device to perform a preset function.

By using the technical solution, the first electronic device may control the second electronic device to perform the preset function.

In one embodiment, the first electronic device includes a first distributed soft bus, and the second electronic device includes a second distributed soft bus. The sending a device control instruction to the second electronic device includes: The first electronic device sends the device control instruction to the second electronic device by using the first distributed soft bus and the second distributed soft bus.

By using the technical solution, the control instruction may be transmitted by using a distributed soft bus, so that the first electronic device may control the second electronic device to perform the preset function.

In one embodiment, the device control instruction is a screenshot instruction. The online interaction method further includes: The first electronic device receives a screenshot image sent by the second electronic device, and stores the screenshot image.

By using the technical solution, the first electronic device may control the second electronic device to take a screenshot, and the first electronic device may receive and store the screenshot image of the second electronic device.

In one embodiment, the online interaction method further includes: The first electronic device receives feedback information from the content provider server for the interaction information, and displays the feedback information.

By using the technical solution, the first electronic device may display the feedback information for interaction information, to improve an interaction effect.

In one embodiment, the interaction control is associated with a playing progress of the first playing content.

By using the technical solution, the interaction control may be started when the playing progress of the first playing content reaches a specific node.

A second aspect of embodiments of this application discloses a multi-device-based online interaction method, including: A first electronic device starts a first application. The first electronic device plays first playing content by using the first application. When the first electronic device receives a control instruction for hopping the first playing content of the first application to a second electronic device, the first electronic device sends a hopping message to the second electronic device. When the second electronic device receives the hopping message, the second electronic device continues to play the first playing content. The first electronic device starts an interaction control. The first electronic device obtains interaction information of the interaction control, and sends the interaction information to a content provider server. The first electronic device receives feedback information from the content provider server for the interaction information, and displays the feedback information. The second electronic device receives the feedback information from the content provider server for the interaction information, and displays the feedback information.

By using the technical solution, first playing content may be hopped between the first electronic device and the second electronic device for playing, and interaction may be performed by using the first electronic device. The interaction information may be sent to the content provider server by using the first electronic device, and both the first electronic device and the second electronic device may display the feedback information for the interaction information, to improve an interaction effect.

In one embodiment, the online interaction method further includes: When the second electronic device continues to play the first playing content, the second electronic device sends a hopping success message to the first electronic device. When the first electronic device receives the hopping success message, the first electronic device stops playing the first playing content.

By using the technical solution, when the first playing content is successfully hopped to the second electronic device for playing, the second electronic device may notify the first electronic device to stop playing the first playing content.

In one embodiment, the online interaction method further includes: When the first electronic device receives a control instruction for stopping hopping the first playing content, the first electronic device sends a stop message to the second electronic device. When the second electronic device receives the stop message, the second electronic device stops playing the first playing content.

By using the technical solution, the first playing content may be hopped from the second electronic device back to the first electronic device for playing.

In one embodiment, the online interaction method further includes: When the second electronic device stops playing the first playing content, the second electronic device sends a hopping stop message to the first electronic device. When the first electronic device receives the hopping stop message, the first electronic device continues to play the first playing content.

By using the technical solution, when the first playing content is hopped back to the first electronic device for playing, the first electronic device may continue a playing progress in the second electronic device to play the first playing content.

In one embodiment, the online interaction method further includes: The first electronic device sends a device control instruction to the second electronic device. The second electronic device performs a preset function based on the device control instruction By using the technical solution, the first electronic device may control the second electronic device to perform the preset function.

In one embodiment, the first electronic device includes a first distributed soft bus, and the second electronic device includes a second distributed soft bus. The sending a device control instruction to the second electronic device includes: The first electronic device sends the device control instruction to the second electronic device by using the first distributed soft bus and the second distributed soft bus.

By using the technical solution, the control instruction may be transmitted by using a distributed soft bus, so that the first electronic device may control the second electronic device to perform the preset function.

In one embodiment, the device control instruction is a screenshot instruction. The online interaction method further includes: The second electronic device sends a screenshot image to the first electronic device. The first electronic device receives and stores the screenshot image.

By using the technical solution, the first electronic device may control the second electronic device to take a screenshot, and the first electronic device may receive and store the screenshot image sent by the second electronic device.

In one embodiment, that the first electronic device starts an interaction control includes: The first electronic device receives a control starting instruction transmitted by the content provider server or the second electronic device. In response to the control starting instruction, the first electronic device starts the interaction control.

By using the technical solution, the interaction control may be started when the first electronic device receives the control starting instruction transmitted by the content provider server or the second electronic device.

In one embodiment, the interaction control is associated with a playing progress of the first playing content.

By using the technical solution, the interaction control may be started when the playing progress of the first playing content reaches a specific node.

In one embodiment, the online interaction method further includes: When the interaction control is started, the second electronic device displays prompt information associated with the interaction control.

By using the technical solution, when the first electronic device starts the interaction control, the second electronic device may display the prompt information associated with the interaction control, to remind a user to perform an interaction operation on the interaction control.

According to a third aspect, an embodiment of this application provides a computer-readable storage medium, including computer instructions. When the computer instructions are run on an electronic device, the electronic device is enabled to perform the multi-device-based online interaction method in the first aspect.

According to a fourth aspect, an embodiment of this application provides an electronic device. The electronic device includes a processor and a memory. The memory is configured to store instructions, and the processor is configured to invoke the instructions in the memory, to enable the electronic device to perform the multi-device-based online interaction method in the first aspect.

According to a fifth aspect, an embodiment of this application provides a computer program product. When the computer program product runs on a computer, the computer is enabled to perform the multi-device-based online interaction method in the first aspect.

According to a sixth aspect, an apparatus is provided. The apparatus has a function of implementing behavior of the first electronic device in the method provided in the first aspect. The function may be implemented by hardware, or may be implemented by hardware by executing corresponding software. The hardware or the software includes one or more modules corresponding to the foregoing function.

It may be understood that the computer-readable storage medium in the third aspect, the electronic device in the fourth aspect, the computer program product in the fifth aspect, and the apparatus in the sixth aspect all correspond to the method in the first aspect. Therefore, for beneficial effects that can be achieved by the computer-readable storage medium in the third aspect, the electronic device in the fourth aspect, the computer program product in the fifth aspect, and the apparatus in the sixth aspect, refer to beneficial effects in the corresponding method provided above. Details are not described herein again.

DESCRIPTION OF EMBODIMENTS

It should be noted that in this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and the like (if existent) are intended to distinguish between similar objects but do not necessarily indicate a specific order or sequence.

For ease of understanding, descriptions of some concepts related to embodiments of this application are provided as examples for reference, as shown in the following:

An electronic device such as a personal computer, a handheld device (such as a mobile phone or a tablet computer), or a television may perform communication connection by using a wireless local area network (WLAN). For example, the wireless local area network in embodiments of this application may be Wi-Fi. An application (APP) may have a plurality of abilities (Abilities). In other words, an APP may include a plurality of Abilities. The Ability is abstraction of the abilities of the APP, and is an important part of the APP. The HarmonyOS supports the application to be deployed in a unit of the Ability. The Ability can be classified into two types: a feature ability (FA) and a particle ability (PA). Each type provides different abilities for a developer to implement different service functions. The FA supports a page ability, which may provide a page ability of interacting with a user. A Page instance may include a group of related pages, and each page is represented by an AbilitySlice instance. The PA may support a service ability and a data ability. The service ability does not have a user interface. The service ability may be a background service, and may be for providing an ability of running a task in a background. The data ability may provide data access abstraction. A service feature of the APP may be carried by the FA. The FA may use various meta-abilities by using the PA.

Figure 1:
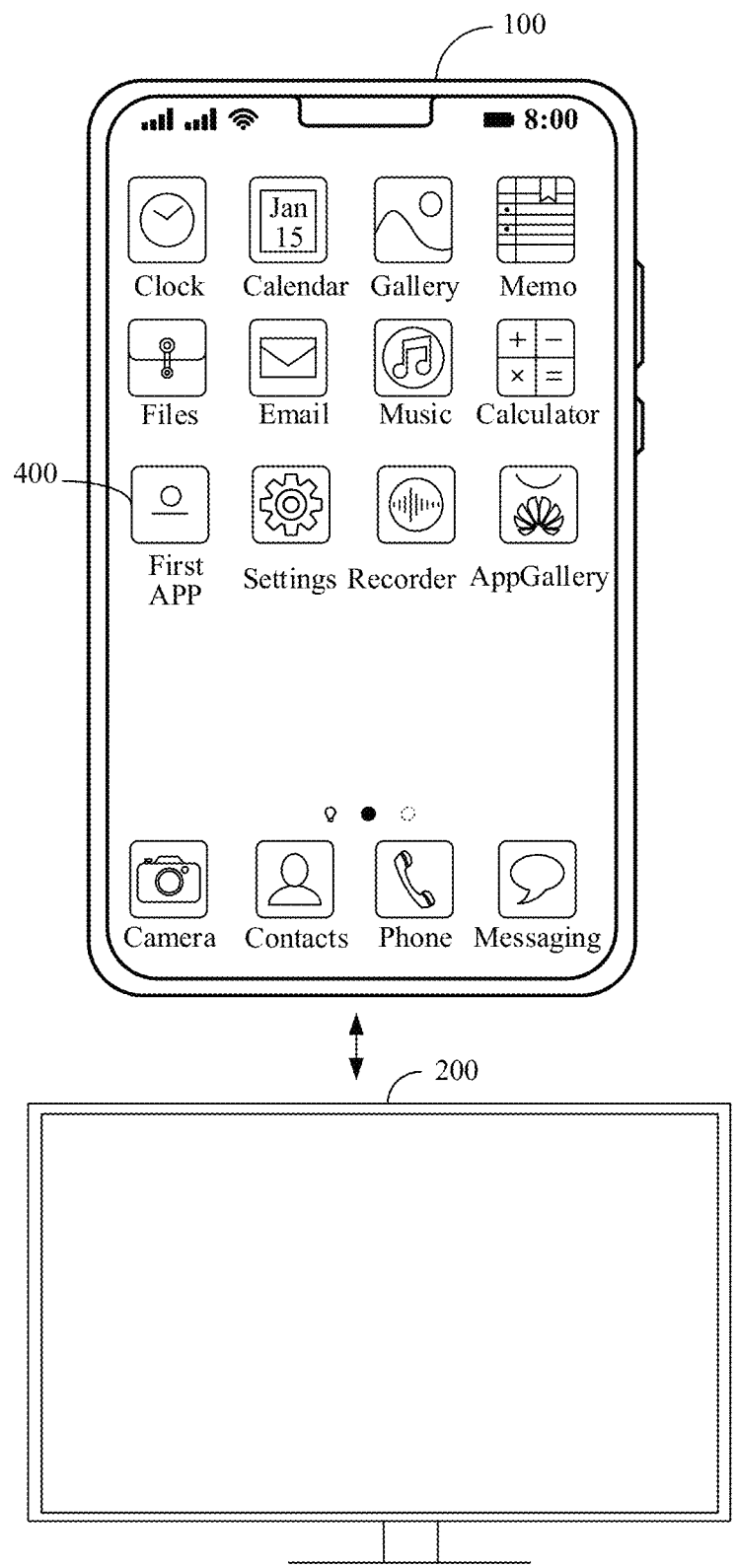
FIG. 1 is a schematic diagram of a multi-device interaction scenario according to an embodiment of this application.

With reference to FIG. 1, the following describes an example of a schematic diagram of a multi-device interaction scenario according to an embodiment of the present invention.

A first electronic device 100 and a second electronic device 200 may be located in a same local area network. The first electronic device 100 and the second electronic device 200 may be communicatively connected by using an interconnection-intercommunication protocol, a distributed soft bus, or the like. A screen size of the second electronic device 200 may be greater than a screen size of the first electronic device 100. The first electronic device 100 may be a small-screen electronic device. For example, the first electronic device 100 is a handheld device such as a mobile phone or a tablet computer. The second electronic device 200 may be a large-screen electronic device. For example, the second electronic device 200 is a liquid crystal television. A first application (APP) 400 is installed on the first electronic device 100, and the first APP 400 may be selected based on an actual requirement. This is not limited herein. For example, the first APP 400 may be an APP having an interaction function and a video/image playing function. For example, the first APP 400 is a live streaming course APP, a game live streaming APP, a video website APP, a short video APP, an e-commerce live streaming APP or an online conference APP.

In some embodiments, a user may perform an interaction operation on the small-screen device (the first electronic device 100), and video playing content or an image may be played on the large-screen device (the second electronic device 200). The interaction operation may be set based on an actual requirement. This is not limited herein. For example, the interaction operation may be a control instruction for adjusting a volume or a playing progress in the large-screen device, or may be writing and submitting a question solving operation, submitting a question answer, performing an interaction chat, sending a bullet screen, or the like.

When the user starts the first APP 400 on the first electronic device 100, the first electronic device 100 enters a playing interface of the first APP 400 to play content. When the user selects to hop the content to the second electronic device 200 for playing, the content currently played on the first electronic device 100 is hopped to the second electronic device 200 for continuing to play. The user may perform the interaction operation on the first electronic device 100, and the played content is transferred to the second electronic device 200 for playing.

Figure 2:
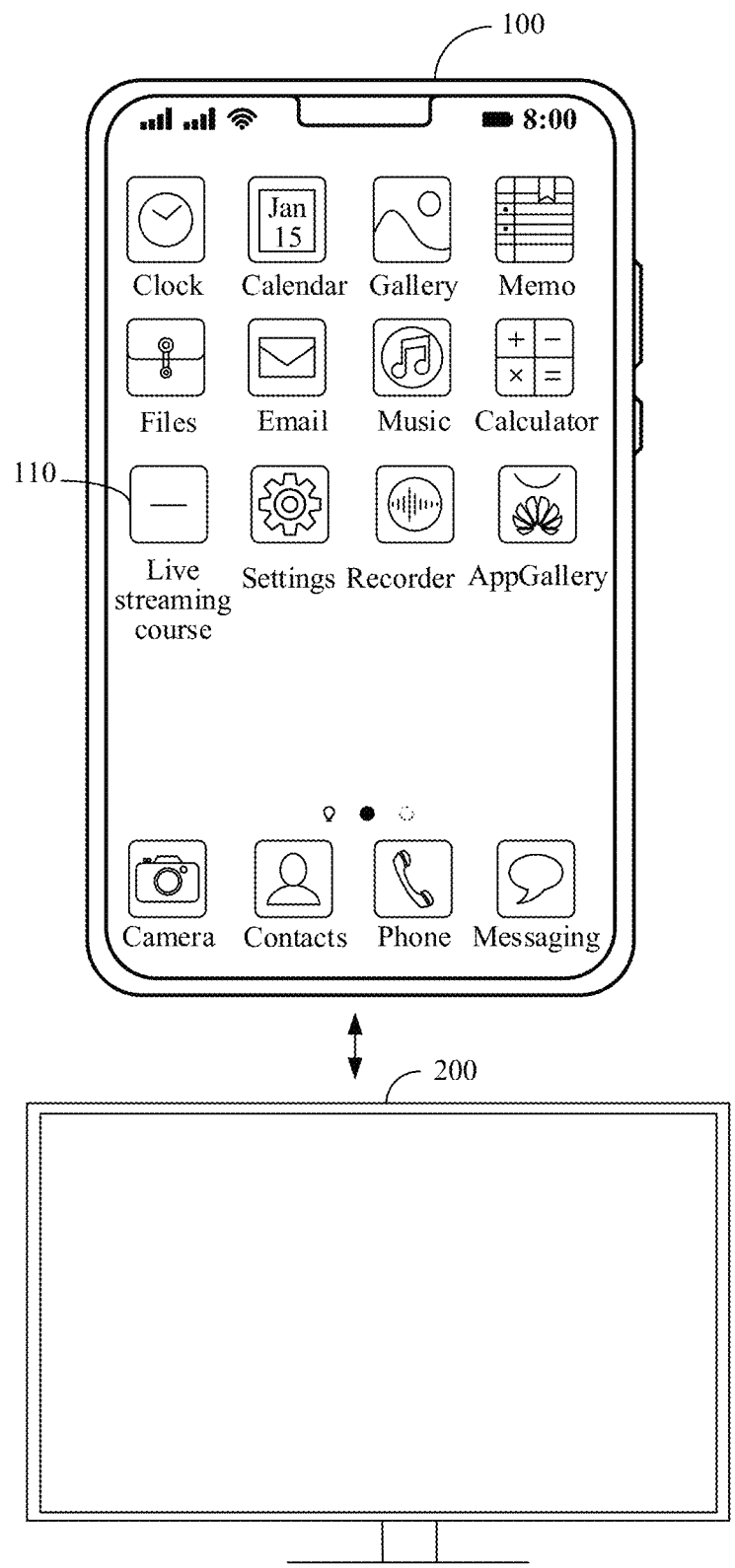
FIG. 2 is a diagram of an application scenario of a multi-device-based online interaction method according to an embodiment of this application.

With reference to FIG. 2, the following describes an example of a diagram of an application scenario of a multi-device-based online interaction method according to an embodiment of the present invention.

Alive streaming course APP 110 may be installed on a first electronic device 100, and the live streaming course APP 110 may be selected based on an actual requirement. This is not limited herein. The first electronic device 100 and a second electronic device 200 may implement migration between a large screen and a small screen by using a ContinueAbility interface and a ReverseAbility interface.

In some embodiments, when the first electronic device 100 and the second electronic device 200 are in a same Wi-Fi network, a user may find, on the live streaming course APP 110 of the first electronic device 100, the second electronic device 200 that can perform hopping for playing. When the user selects to hop first playing content of the live streaming course APP 110 to the second electronic device 200, the second electronic device 200 may enter a corresponding playing progress, and the first electronic device 100 may output prompt information "In course, please watch the large screen". The user may perform online course learning by using a screen, a camera, a microphone, and a speaker of the second electronic device 200, to obtain better audio-visual experience by using a hardware device of the second electronic device 200. That the second electronic device 200 enters the corresponding playing progress may mean that when the user selects to hop the first playing content of the live streaming course APP 110 to the second electronic device 200, the second electronic device 200 continues the playing progress in the first electronic device 100 to play.

Figure 3:
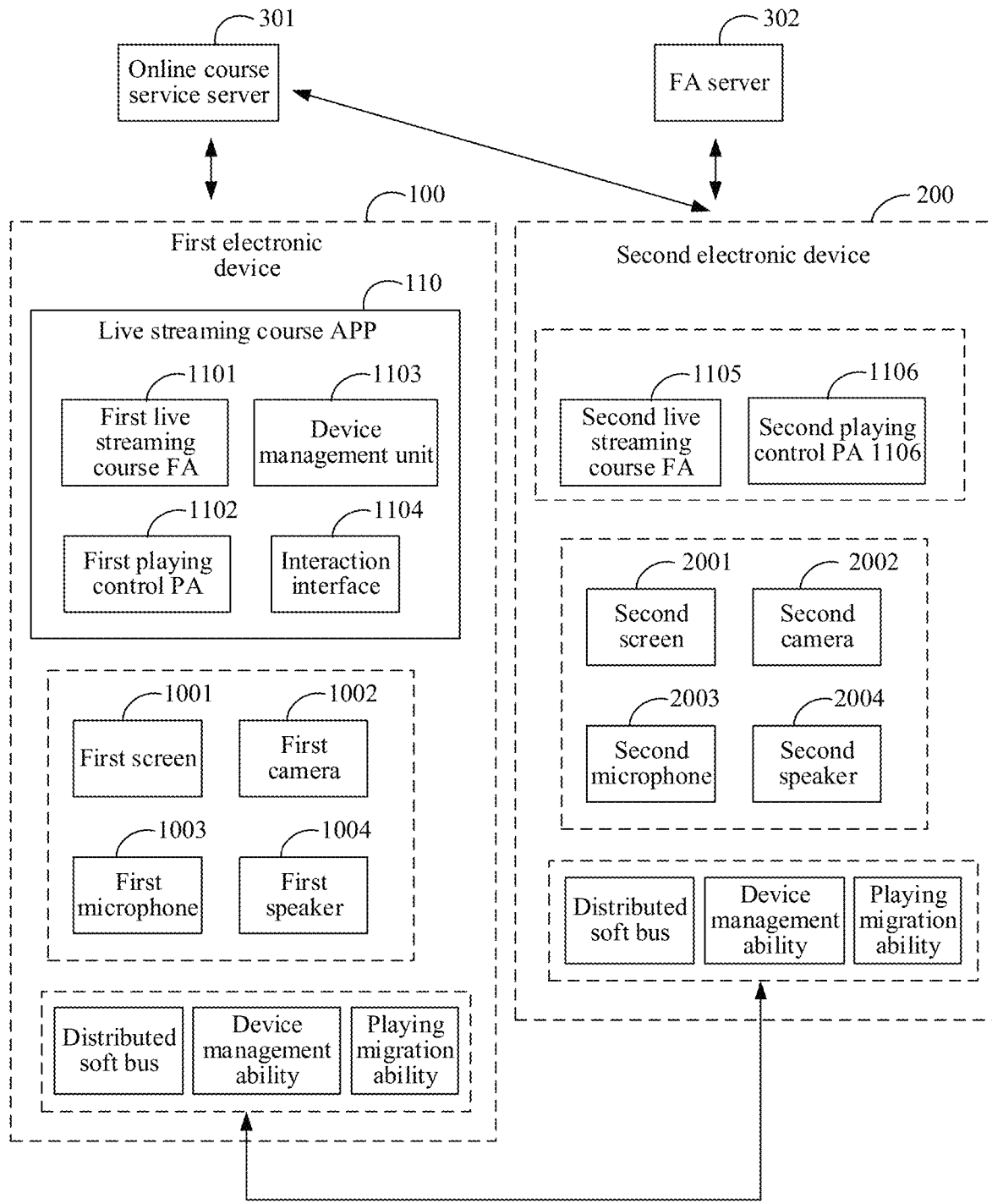
FIG. 3 is a schematic diagram of an architecture of interaction between a first electronic device and a second electronic device according to an embodiment of this application.

FIG. 3 is a schematic diagram of an architecture of interaction between a first electronic device 100 and a second electronic device 200 according to an embodiment of this application;

A live streaming course APP 110 is installed on the first electronic device 100. The live streaming course APP 110 may include a first live streaming course FA 1101, a first playing control PA 1102, a device management unit 1103, and an interaction interface 1104. The interaction interface 1104 may implement live streaming course interaction. For example, the interaction interface 1104 may be a question answering board, a handwriting board, a playing control board, and the like. A user may use a stylus to perform an operation, such as writing a question answer or submitting question answering content, on the question answering board or the handwriting board. The live streaming course APP 110 may communicate with an online course service server 301, to implement playing of a live streaming course. The second electronic device 200 may communicate with an FA server 302, to download a second live streaming course FA 1105 from the FA server 302 and install the FA 1105. The second live streaming course FA 1105 may also communicate with the online course service server 301, to implement playing of the live streaming course.

The first electronic device 100 and the second electronic device 200 may have some same system abilities, and the system abilities may include a distributed soft bus, a device management ability, a playing migration ability, and the like. The distributed soft bus may provide a unified distributed communication ability for interconnection-intercommunication between devices. For example, the first electronic device 100 is a mobile phone, and the second electronic device 200 is a television. The user may search, on the live streaming course APP 110 of the mobile phone by using the device management unit 1103 and a device management ability of a mobile phone system, for an electronic device that can perform hopping for playing. The user may alternatively select a device from a device list that is returned by the device management unit 1103 and that can perform hopping for playing, to hop the live streaming course FA for playing. When the user selects the television to hop the live streaming course FA for playing, the user can notify a device management ability of a television system of a hopping message by using a playing migration ability of the mobile phone system. When the television receives the hopping message, and the second live streaming course FA 1101 and a second playing control PA 1106 are already installed, the television may directly start the second live streaming course FA 1105, and enter a corresponding playing progress. The first electronic device 100 may exit the first live streaming course FA 1101, and the first electronic device 100 may start the interaction interface 1104. In this case, the user may perform online course interaction or playing control, for example, adjusting a volume, pausing/playing control, taking a screenshot, or question answering, on the interaction interface 1104. Control information (a device control instruction for controlling the second electronic device 200) of the user on the mobile phone may be synchronized to the second live streaming course FA 1105 and/or the second playing control PA 1106 on the television by using a distributed soft bus of the mobile phone and a distributed soft bus of the television. For example, the device control instruction is a volume adjustment instruction, a playing progress adjustment instruction, or a screenshot instruction. The device control instruction may be synchronized to the second playing control PA 1106 on the television by using the distributed soft bus of the mobile phone and the distributed soft bus of the television, to implement remote control of the television at a mobile phone end.

In some embodiments, interaction information of the online course interaction performed on the interaction interface 1104 may be question answering content, a question answer, or the like. The interaction information may be directly sent by the first electronic device 100 to the online course service server 301, to perform an operation such as interactive question answering or submitting question answering content at the mobile phone end.

When the television receives the hopping message notification, and the second live streaming course FA 1105 is not installed, the television may automatically download the second live streaming course FA 1105 and the second playing control PA 1106 from the FA server 302, and start the second live streaming course FA 1105 after the downloading is completed, so that the television enters a corresponding playing progress. For example, when the television receives the hopping message notification and the second live streaming course FA 1105 is not installed, the television may download the second live streaming course FA 1105 and the second playing control PA 1106 from the FA server 302. For example, the television may download the related FA and PA in a silent download manner.

In some embodiments, the first electronic device 100 and the second electronic device 200 may have some same hardware modules. For example, the first electronic device 100 includes a first screen 1001, a first camera 1002, a first microphone 1003, and a first speaker 1004, and the second electronic device 200 includes a second screen 2001, a second camera 2002, a second microphone 2003, and a second speaker 2004. A size of the first screen 1001 is less than a size of the second screen 2001, so that the user can obtain better audio-visual experience and a more panoramic photographing angle by performing online course learning by using the second electronic device 200.

In some embodiments, when an online course is hopped to the second electronic device 200 for playing, the live streaming course APP 110 on the first electronic device 100 may automatically start the interaction interface 1104, and the user may perform course interaction by using the interaction interface 1104. For example, the user writes question answering content or submits an answer on the interaction interface 1104. In another embodiment, when an online course is hopped to the second electronic device 200 for playing, the user may alternatively manually start the interaction interface 1104 on the live streaming course APP 110 of the first electronic device 100. Alternatively, when online course content is played to some specific nodes (for example, a node that requires the user to answer a question), the interaction interface 1104 is automatically started. For example, when the online course content is played to some specific nodes, the online course service server 301 or the second electronic device 200 may transmit a control starting instruction to the first electronic device 100. In response to the control starting instruction, the first electronic device 100 starts the interaction interface 1104.

In some embodiments, after an online course is hopped to the second electronic device 200 for playing, the user may select, on the live streaming course APP 110 of the first electronic device 100, to stop hopping a live streaming course for playing (that is, to hop the online course back to the first electronic device 100 for playing). For example, after the online course is hopped to the second electronic device 200 for playing, a hopping for playing stop icon is displayed on the live streaming course APP 110 of the first electronic device 100, so that a function of hopping the online course back to the first electronic device 100 for playing can be implemented. When the user taps the hopping for playing stop icon, the online course may be hopped back to the first electronic device 100 for playing, and the second electronic device 200 stops playing the online course. When the user taps the hopping for playing stop icon, the user may exit the second live streaming course FA 1105 on the second electronic device 200 by using the playing migration ability of the second electronic device 200, exit the interaction interface 1104 by using a playing migration ability of the first electronic device 100, and start the first live streaming course FA 1101 on the first electronic device 100, so that the first electronic device 100 continues to play from a corresponding playing progress, and the online course of the second electronic device 200 is hopped back to the first electronic device 100 for playing.

In some embodiments, after an online course is hopped to the second electronic device 200 for playing, the user may further use a camera of the first electronic device 100 to perform video recording, and recorded content may be sent by the first electronic device 100 to the online course service server 301, so that a back-end online course teacher checks a learning result, for example, checks whether pronunciation and stress are accurate.

Figure 4A:
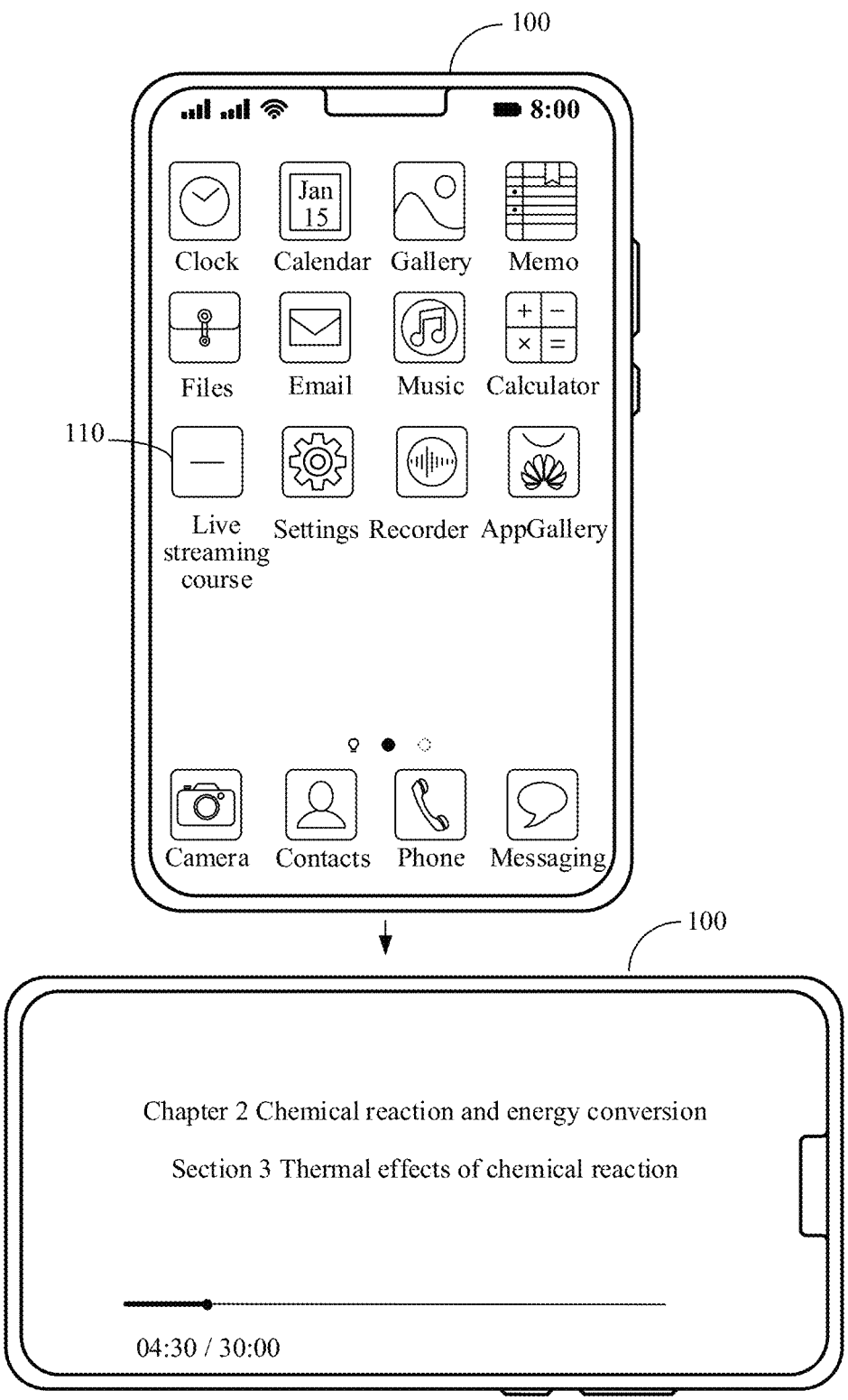
FIG. 4a to FIG. 4g are schematic diagrams of interaction between a first electronic device and a second electronic device according to an embodiment of this application.
Figure 4B:
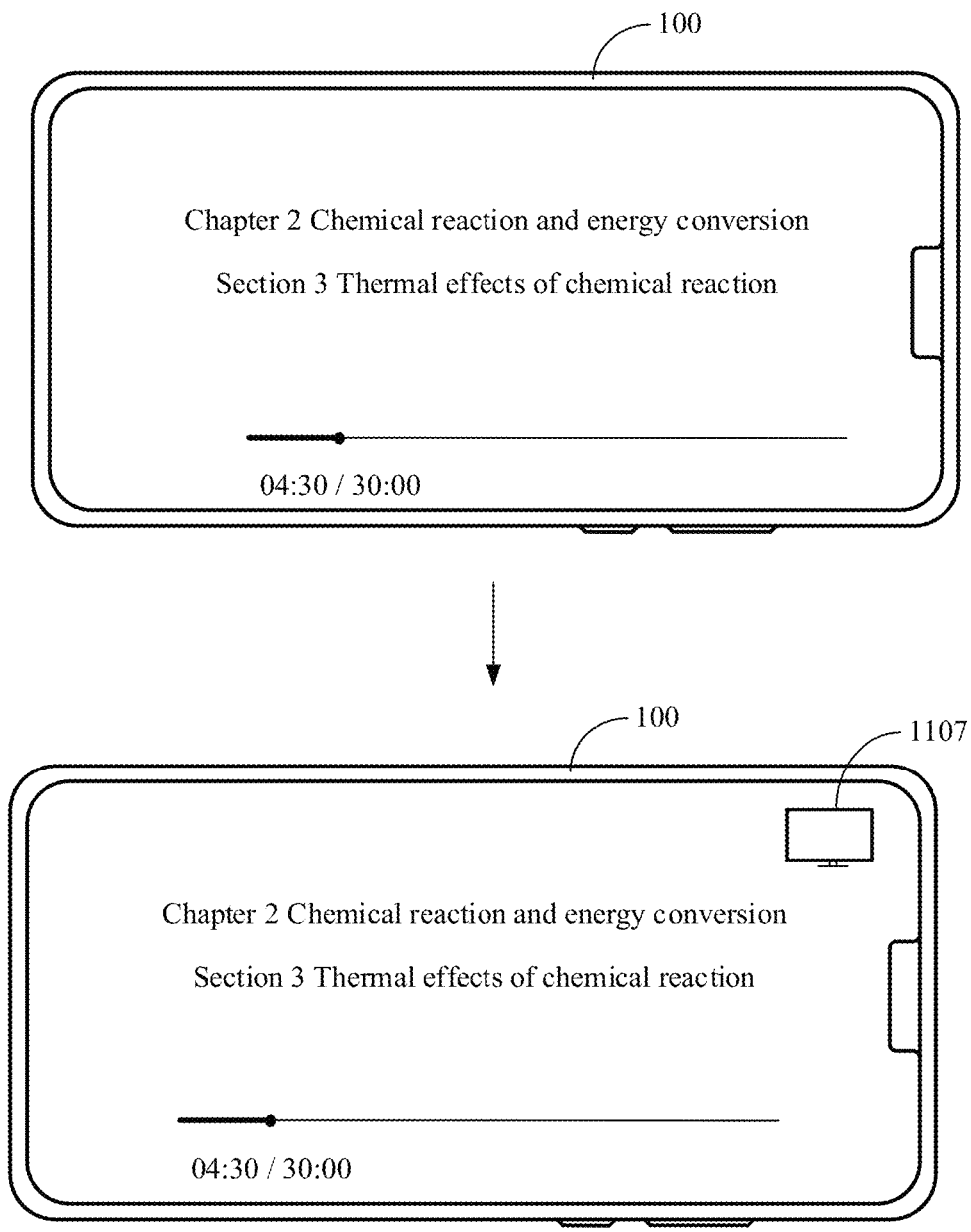
Figure 4C:
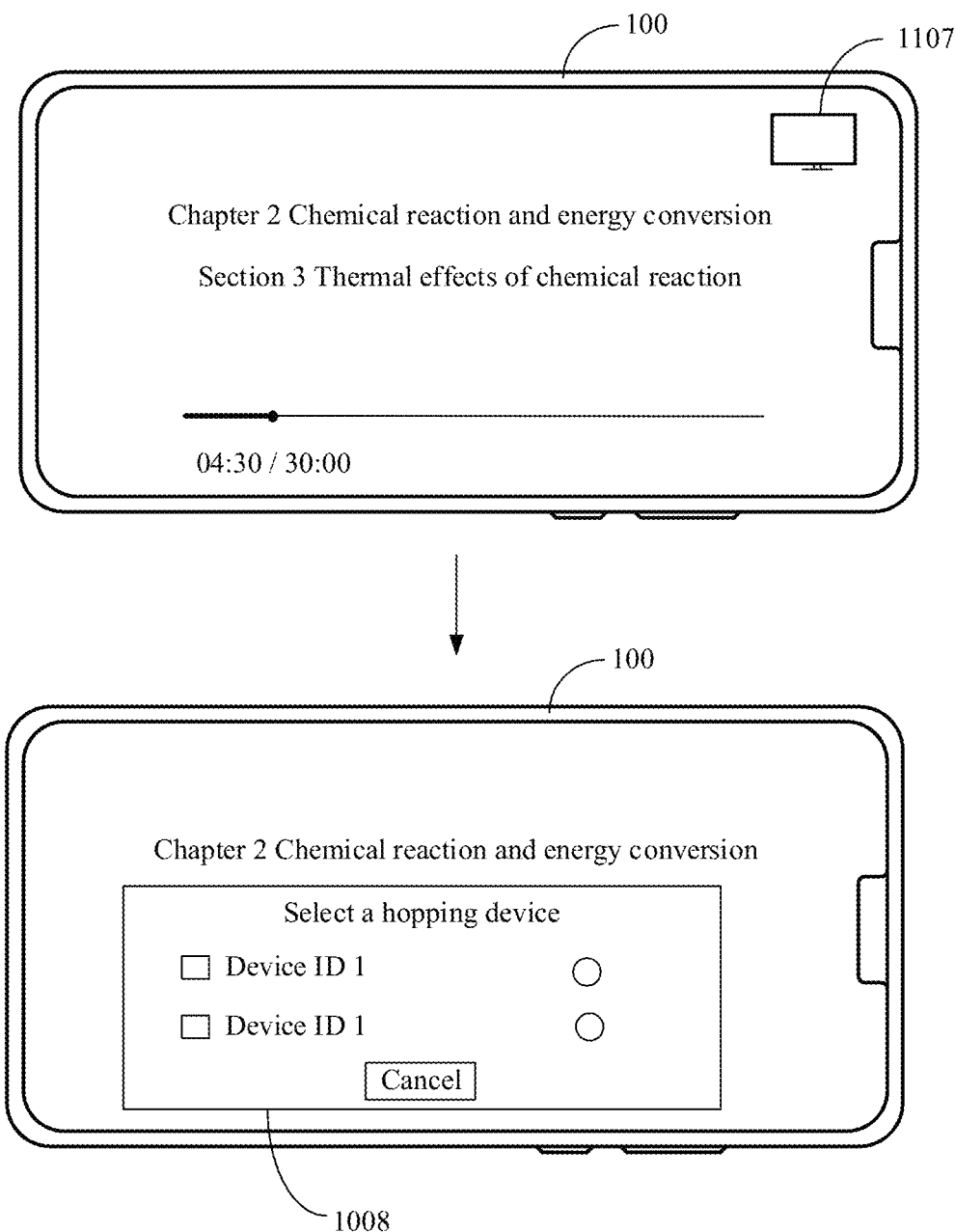
Figure 4D:
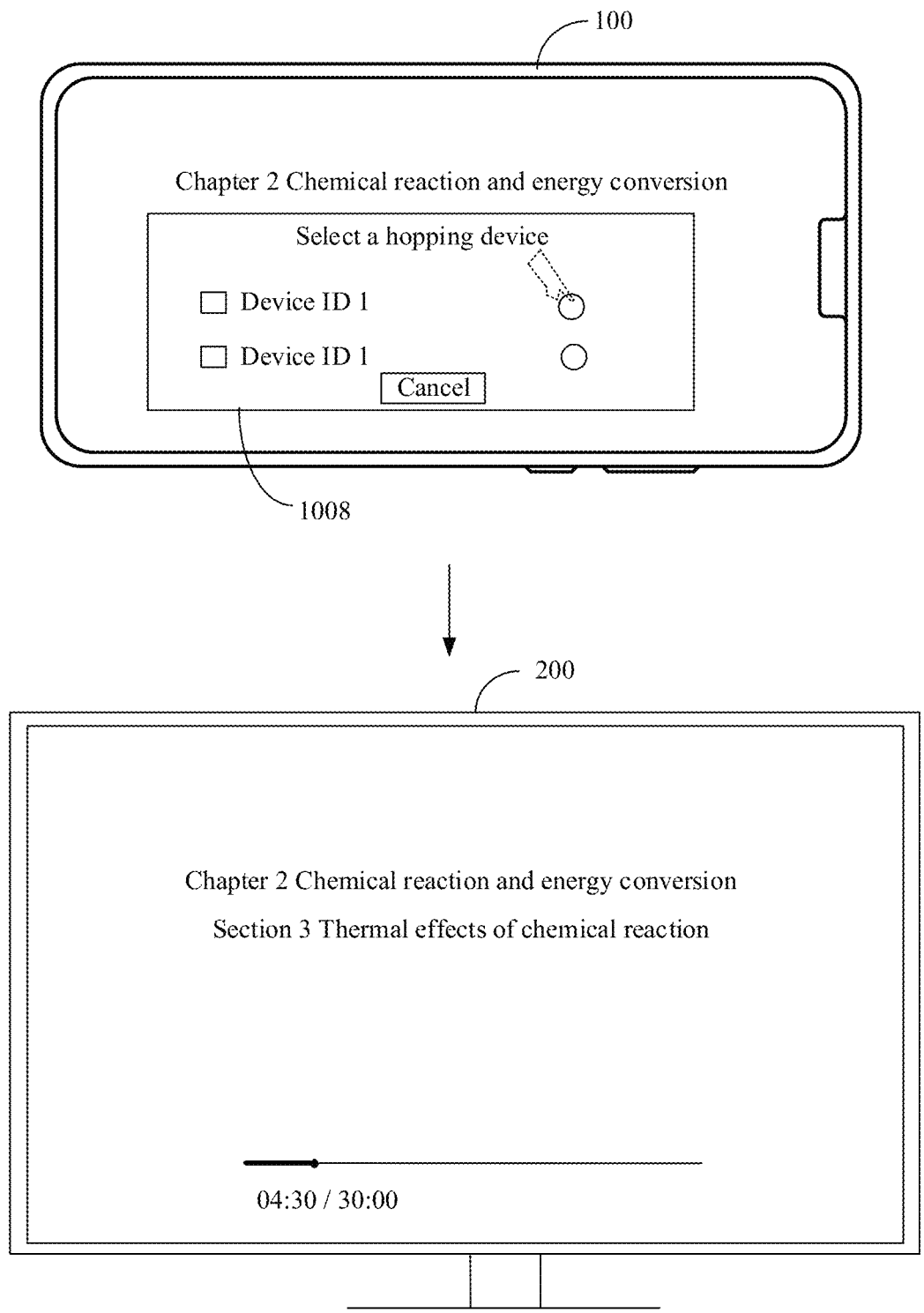

As shown in FIG. 4a to FIG. 4g, an example in which a first electronic device 100 is a mobile phone and a second electronic device 200 is a television is used for description. As shown in FIG. 4a, after a user starts a live streaming course APP 110 on the first electronic device 100, the first electronic device 100 enters an online course playing interface, and first playing content is chemistry course content. As shown in FIG. 4b, when the user performs a control operation (for example, performs a touch operation on any area of the online course playing interface) on the online course playing interface, a hopping for playing icon 1107 may be invoked. As shown in FIG. 4c, when the user taps the hopping for playing icon 1107, a list 1108 of devices that can perform hopping for playing is popped up. For example, the list 1108 of devices includes a device ID 1 and a device ID 2. As shown in FIG. 4d, it is assumed that the device ID 1 is the second electronic device 200. When the user selects the device ID 1 from the list 1108 of devices as a hopping for playing device, the user may control the second electronic device 200 to start a second live streaming course FA 1105, and enter a corresponding playing progress, so that the user may perform online course learning by using the second electronic device 200.

Figure 4E:
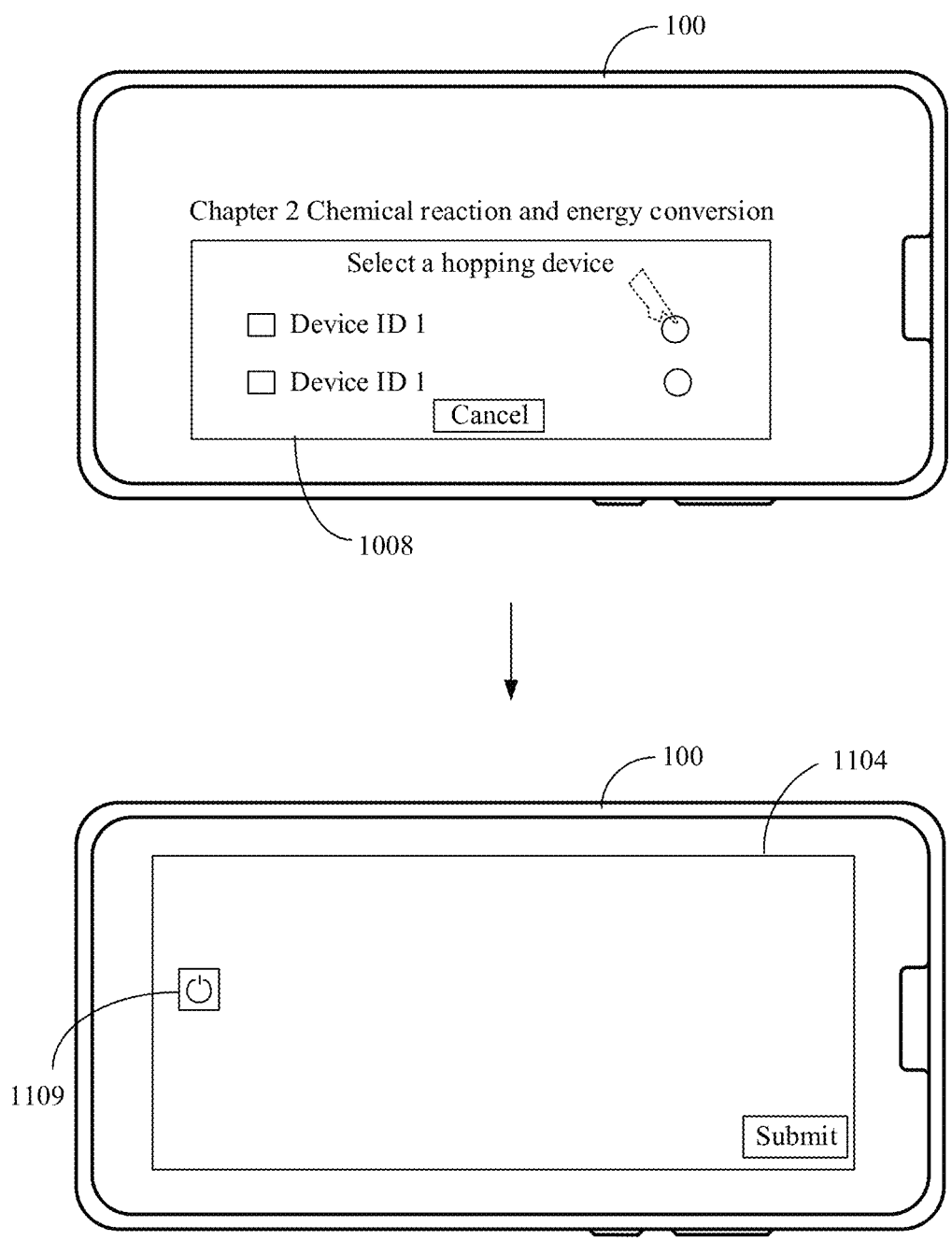
Figure 4F:
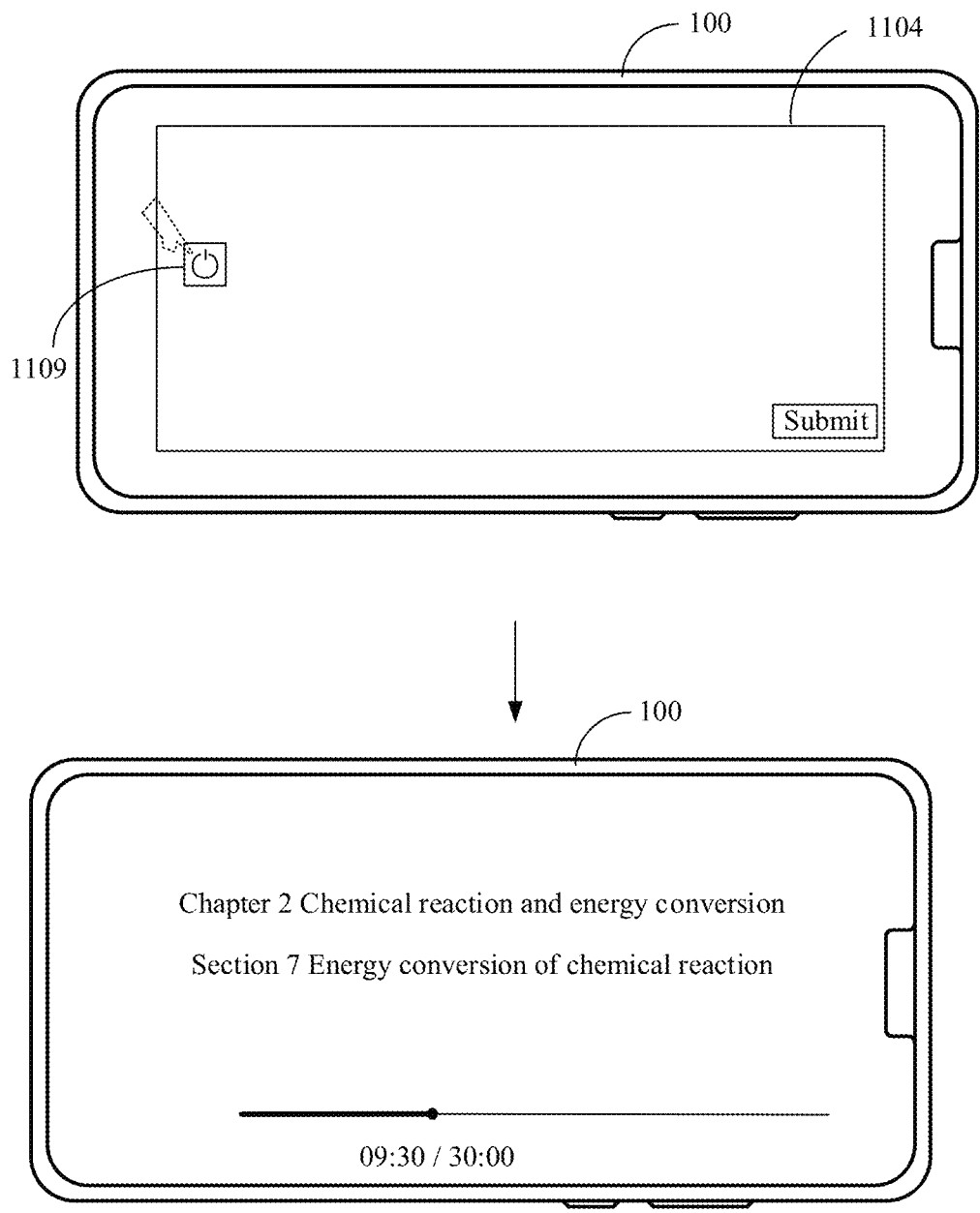
Figure 4G:
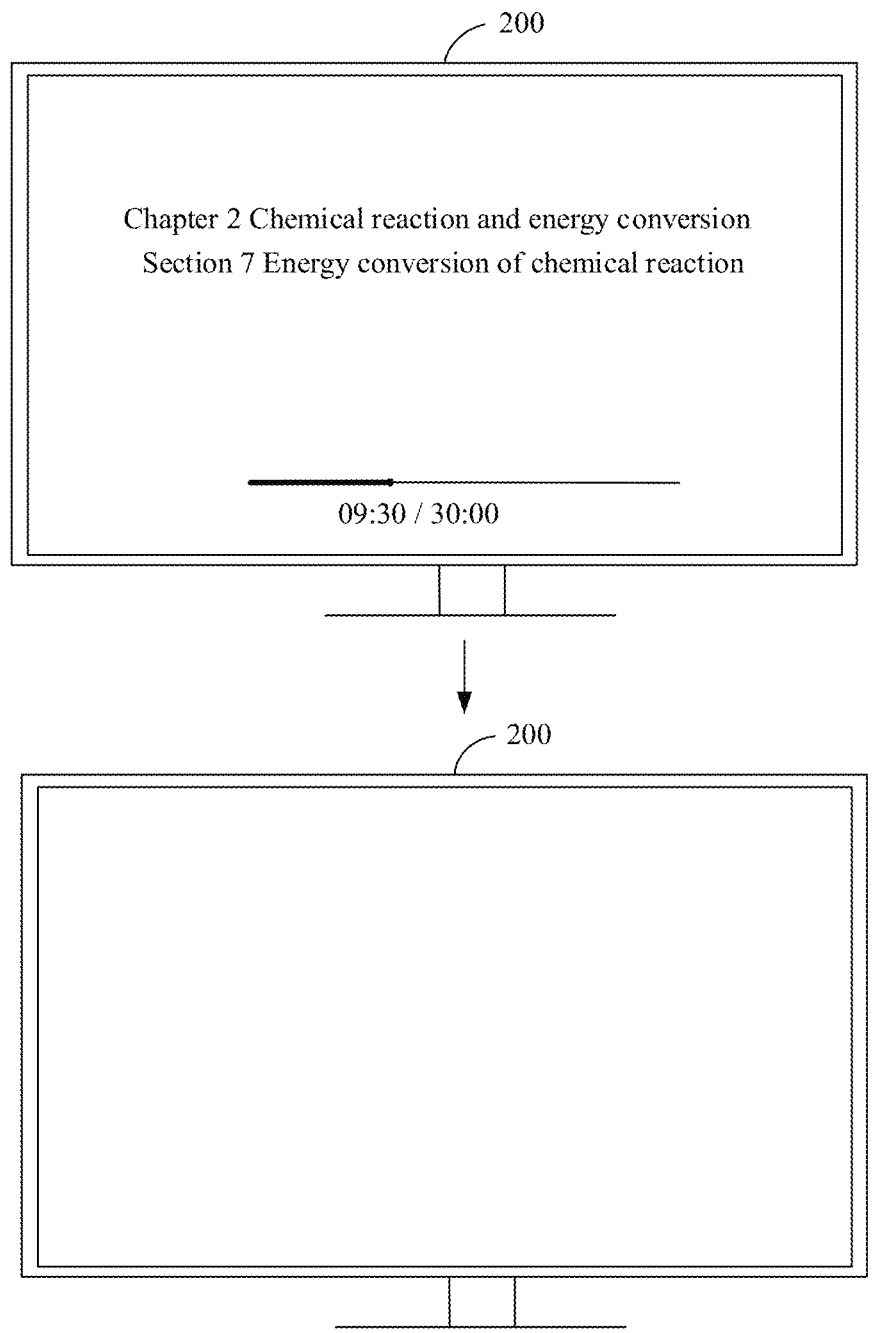

As shown in FIG. 4e, after an online course is hopped to the second electronic device 200 for playing, an interaction interface 1104 is started. A hopping for playing stop icon 1109 may be set in the interaction interface 1104. As shown in FIG. 4f and FIG. 4g, when the user taps the hopping for playing stop icon 1109, the second electronic device 200 exits the second live streaming course FA 1105, and the first electronic device 100 starts a first live streaming course FA 1101, so that the online course is hopped back to the first electronic device 100 for playing. In another embodiment, when the interaction interface 1104 is not displayed in a full-screen manner, the hopping for playing stop icon 1109 may alternatively be displayed outside an area of the interaction interface 1104.

In some embodiments, the hopping for playing icon 1107 and the hopping for playing stop icon 1109 may alternatively use a same icon, and are distinguished by using an icon color (for example, a color depth or a color type).

In some embodiments, the hopping for playing icon 1107 and the hopping for playing stop icon 1109 may alternatively not be set, and a specific gesture is defined to implement hopping the first playing content from the first electronic device 100 to the second electronic device 200 for playing, and stopping hopping the first playing content (to be specific, hopping the first playing content from the second electronic device 200 back to the first electronic device 100 for playing). For example, when the user starts the live streaming course APP 110 on the first electronic device 100 and detects an upward sliding gesture on a playing interface of the live streaming course APP 110, the first playing content is hopped from the first electronic device 100 to the second electronic device 200 for playing. When a downward sliding gesture is detected, the first playing content is hopped from the second electronic device 200 back to the first electronic device 100 for playing.

Figure 5:
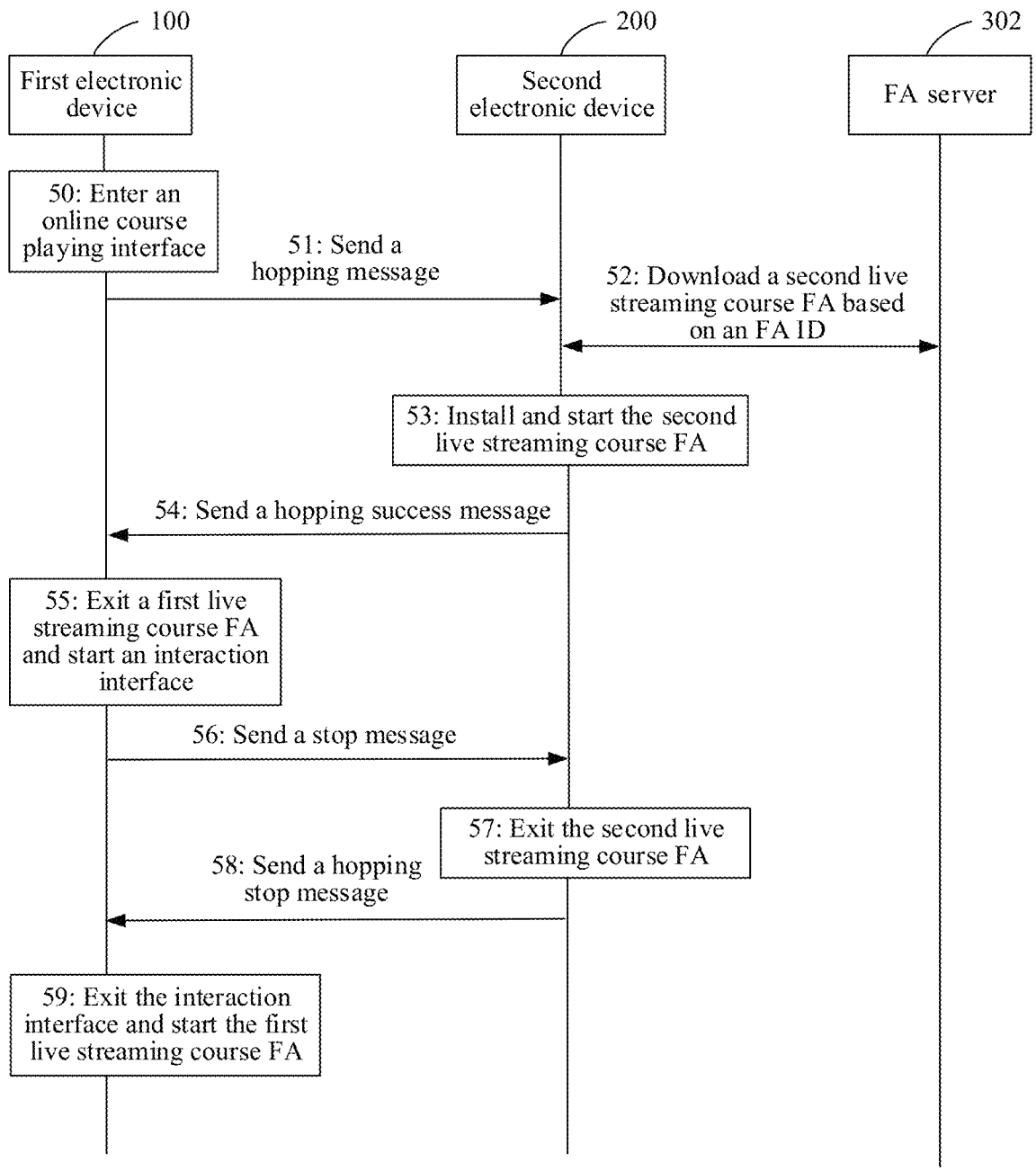
FIG. 5 is a diagram of data exchange between a first electronic device and a second electronic device according to an embodiment of this application.
Figure 6:
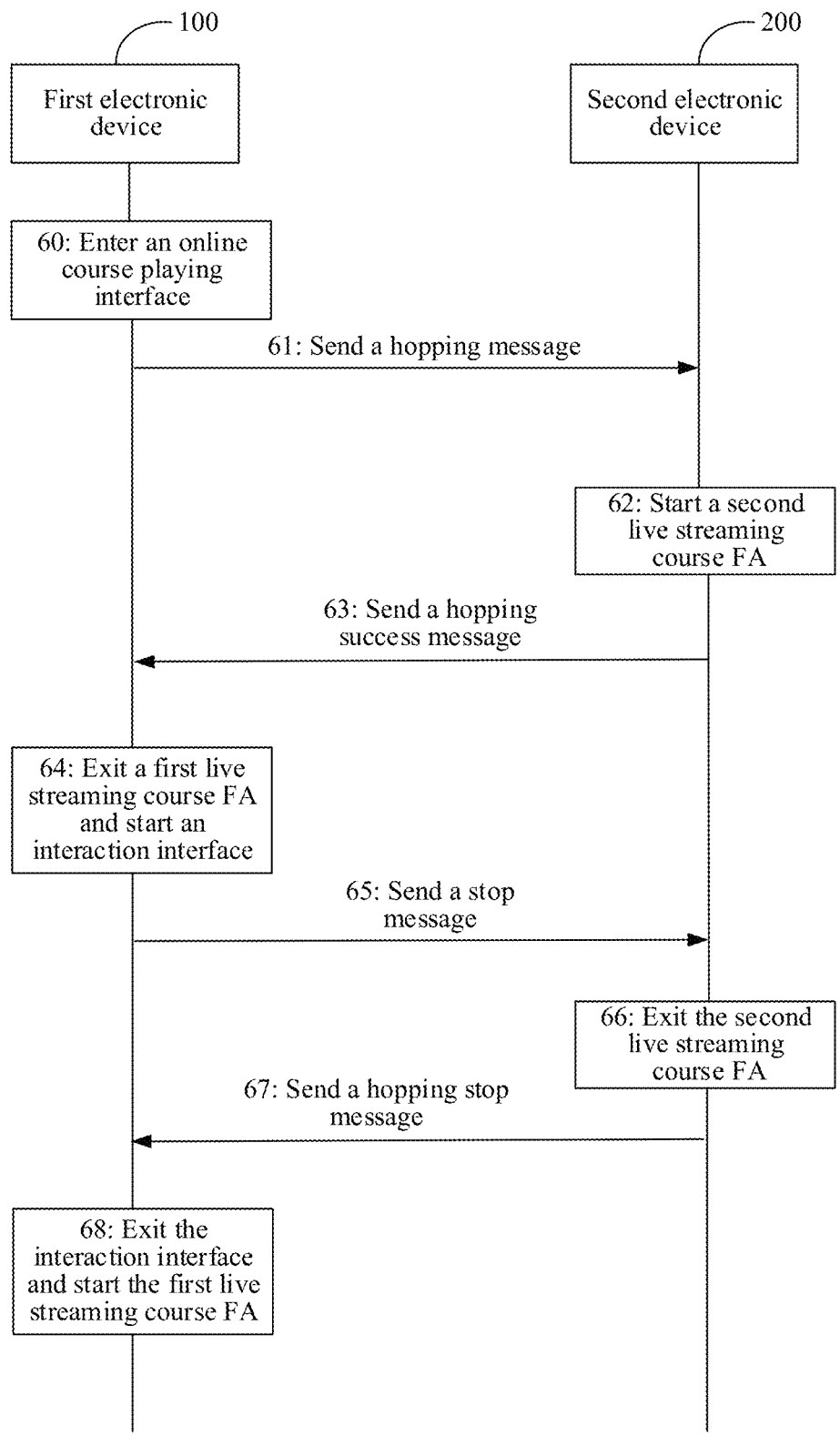
FIG. 6 is a diagram of data exchange between a first electronic device and a second electronic device according to another embodiment of this application.

With reference to FIG. 5 and FIG. 6, the following describes an example of a schematic diagram of interaction between a first electronic device 100 and a second electronic device 200 according to an embodiment of the present invention.

For ease of description below, in an application scenario described below, a live streaming course APP 110 is pre-installed on the first electronic device 100, the first electronic device 100 is a small-screen electronic device, the second electronic device 200 is a large-screen electronic device, and the first electronic device 100 and the second electronic device 200 are located in a same local area network. As shown in FIG. 5, a process of interaction between a first electronic device 100 and a second electronic device 200 may specifically include the following operations.

50: A user starts a live streaming course APP 110, and the first electronic device 100 enters an online course playing interface, so that the user can use a hardware module (a microphone, a speaker, a camera, or the like) of the first electronic device 100 to perform online course learning. Online course playing may be live streaming course playing, recorded course playing, or the like. This is not limited herein.

51: The user selects, on the first electronic device 100, to hop to a large screen for playing, and selects the second electronic device 200 as a hopping for playing device. The first electronic device 100 sends a hopping message to notify the second electronic device 200. The hopping message includes an identity document (Identity Document, ID) of a live streaming course FA.

52: The second electronic device 200 downloads a second live streaming course FA 1105 from a FA server 302 based on the ID of the live streaming course FA.

53: The second electronic device 200 installs the second live streaming course FA 1105, and starts the second live streaming course FA 1105 to enter a corresponding playing progress, so that the user can perform online course learning by using software and hardware modules of the second electronic device 200.

54: The second electronic device 200 sends a hopping success message to the first electronic device 100.

55: The first electronic device 100 exits a first live streaming course FA 1101, and the first electronic device 100 may further start an interaction interface 1104, so that the user can perform course interaction by using the interaction interface 1104.

In some embodiments, when an online course is hopped to the second electronic device 200 for playing, the live streaming course APP 110 on the first electronic device 100 may automatically start the interaction interface 1104, and the user may perform course interaction by using the interaction interface 1104. For example, the user writes question answering content or submits an answer on the interaction interface 1104.

In some embodiments, when an online course is hopped to the second electronic device 200 for playing, the user may alternatively manually start the interaction interface 1104 on the live streaming course APP 110 of the first electronic device 100. Alternatively, when online course content is played to some specific nodes (for example, a node that requires the user to answer a question), the first electronic device automatically starts the interaction interface 1104.

56: The user selects, on the first electronic device 100, to stop hopping to the large screen. The first electronic device 100 sends a stop message to notify the second electronic device 200.

57: The second electronic device 200 exits the second live streaming course FA 1105.

58: The second electronic device 200 sends a hopping stop message to the first electronic device 100.

59: The first electronic device 100 exits the interaction interface 1104, and starts the first live streaming course FA 1101, so that the user can continue to use software and hardware modules of the first electronic device 100 to perform online course learning.

In another scenario, the live streaming course APP 110 is pre-installed on the first electronic device 100, and the second live streaming course FA 1105 is pre-installed on the second electronic device 200. For example, before performing hopping for playing, a user may pre-control the second electronic device 200 to download and install the second live streaming course FA 1105 from a FA server 302. The first electronic device 100 is a small-screen electronic device, the second electronic device 200 is a large-screen electronic device, and the first electronic device 100 and the second electronic device 200 are located in a same local area network. As shown in FIG. 6, a process of interaction between a first electronic device 100 and a second electronic device 200 may specifically include the following operations.

60: A user starts a live streaming course APP 110, and the first electronic device 100 enters an online course playing interface, so that the user can use a hardware module (a microphone, a speaker, a camera, or the like) of the first electronic device 100 to perform online course learning.

61: The user selects, on the first electronic device 100, to hop to a large screen for playing, and selects the second electronic device 200 as a hopping for playing device. The first electronic device 100 sends a hopping message to notify the second electronic device 200.

62: The second electronic device 200 starts a second live streaming course FA 1105 and enters a corresponding playing progress, so that the user can perform online course learning by using a hardware module of the second electronic device 200.

63: The second electronic device 200 sends a hopping success message to the first electronic device 100.

64: The first electronic device 100 exits a first live streaming course FA 1101, and the first electronic device 100 may further start an interaction interface 1104, so that the user can perform course interaction by using the interaction interface 1104.

65: The user selects, on the first electronic device 100, to stop hopping to the large screen. The first electronic device 100 sends a stop message to notify the second electronic device 200.

66: The second electronic device 200 exits the second live streaming course FA 1105.

67: The second electronic device 200 sends a hopping stop message to the first electronic device 100.

68: The first electronic device 100 exits the interaction interface 1104, and starts the first live streaming course FA 1101, so that the user can continue to use the hardware module of the first electronic device 100 to perform online course learning.

In this application, cross-device migration can be performed on a live streaming course FA between the first electronic device and the second electronic device, and a scenario of large-screen course listening and small-screen interaction may be completed in combination of a stylus, so that a problem that eyes are easily hurt and teaching interaction is weak due to an excessively small screen of a handheld terminal in an existing education live streaming course scenario can be resolved.

Embodiment 1

Figure 7A:
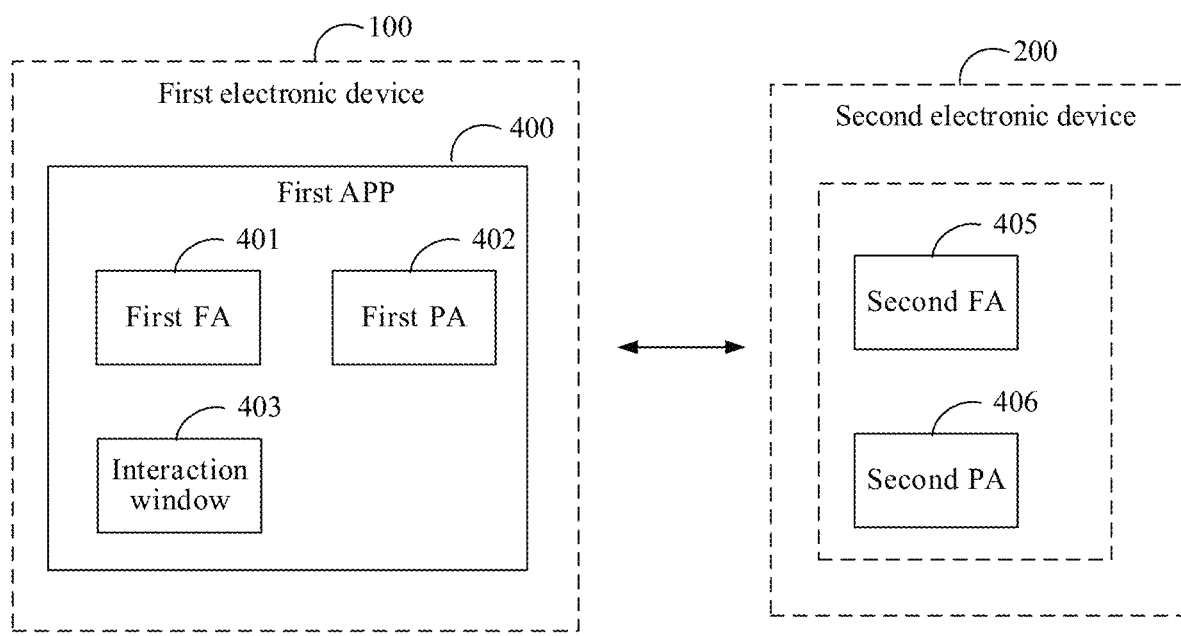
FIG. 7a is a schematic diagram of software architectures of a first electronic device and a second electronic device according to an embodiment of this application.
Figure 7B:
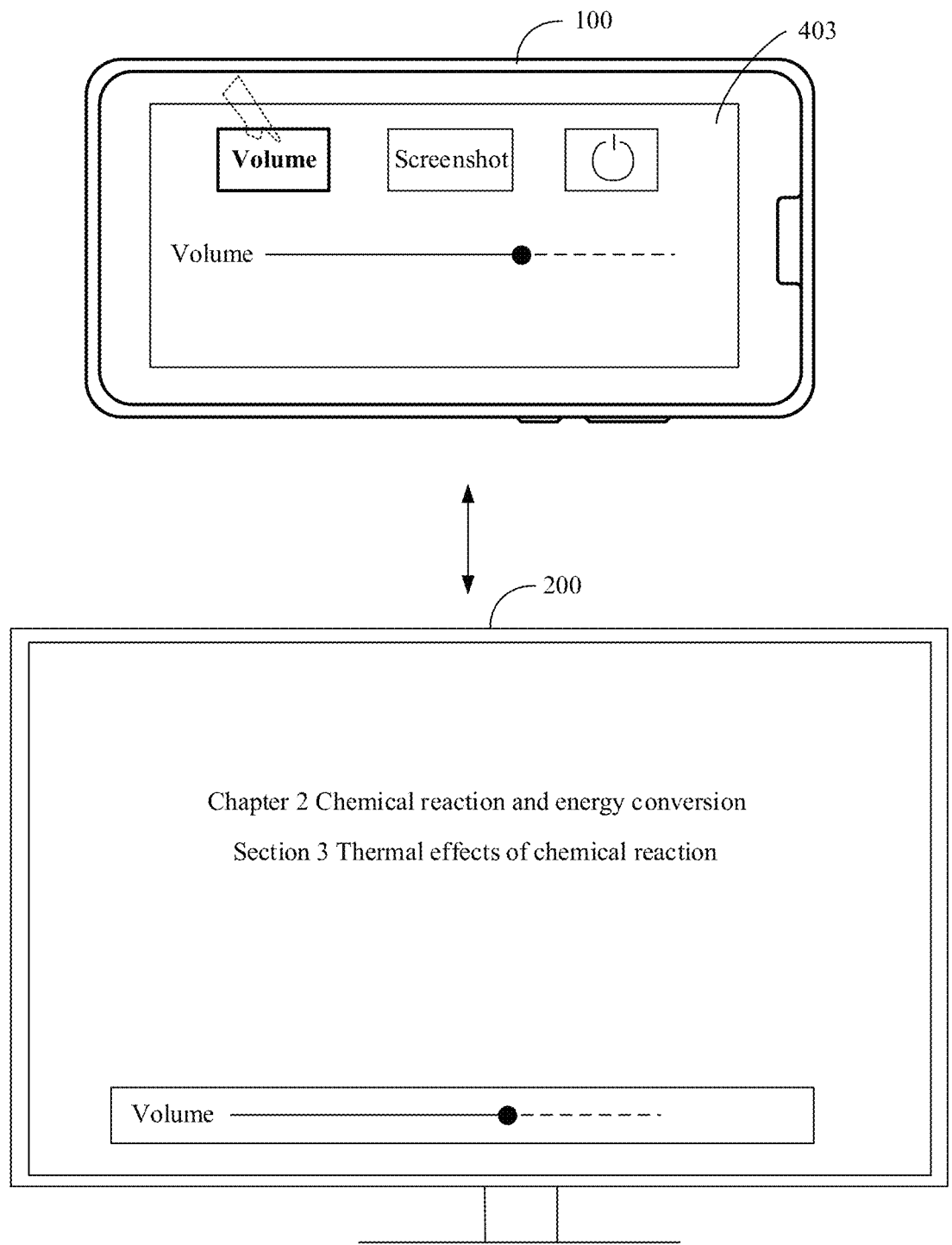
FIG. 7b to FIG. 7f are schematic diagrams of interaction between a first electronic device and a second electronic device according to another embodiment of this application.
Figure 7C:
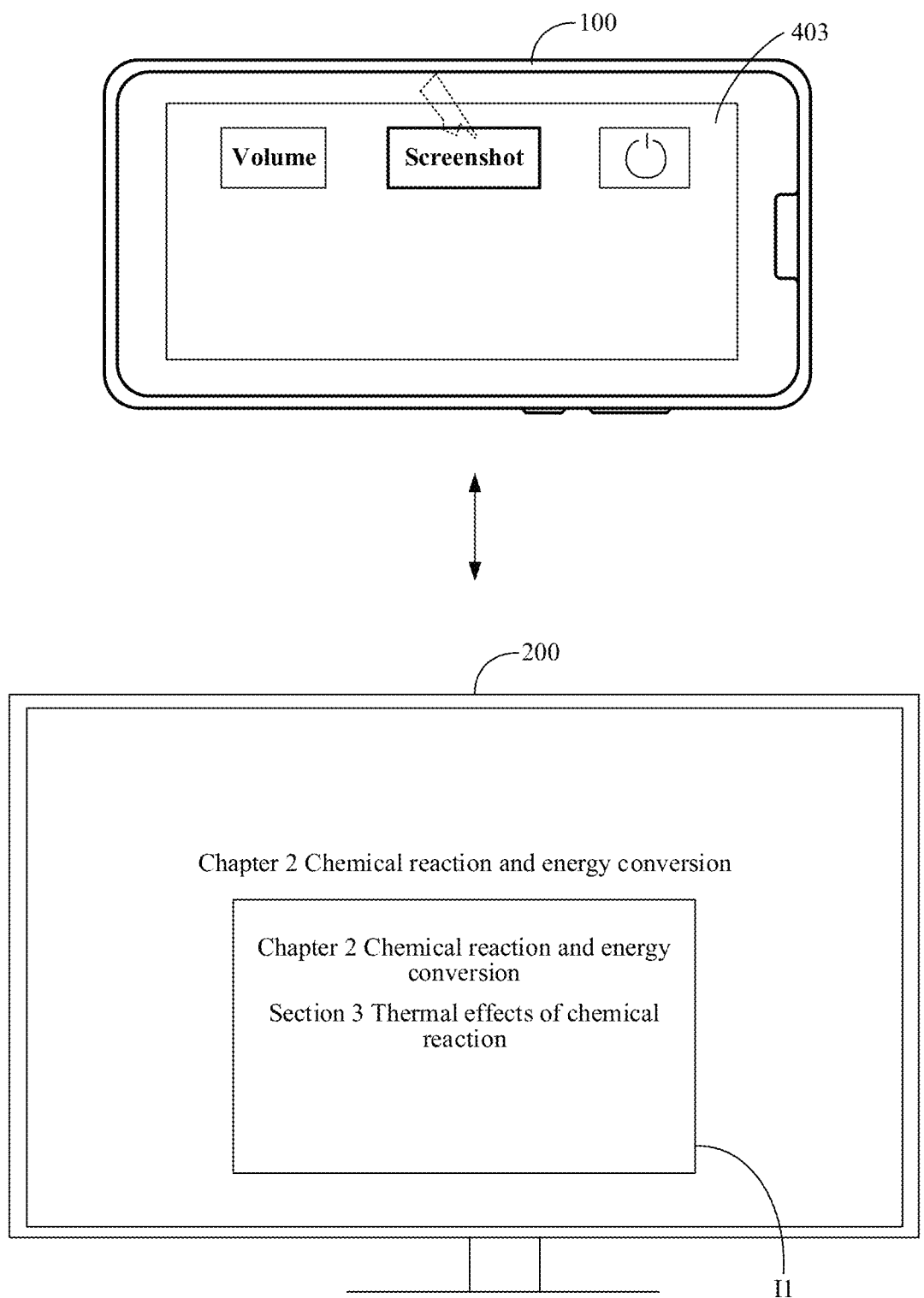
Figure 7D:
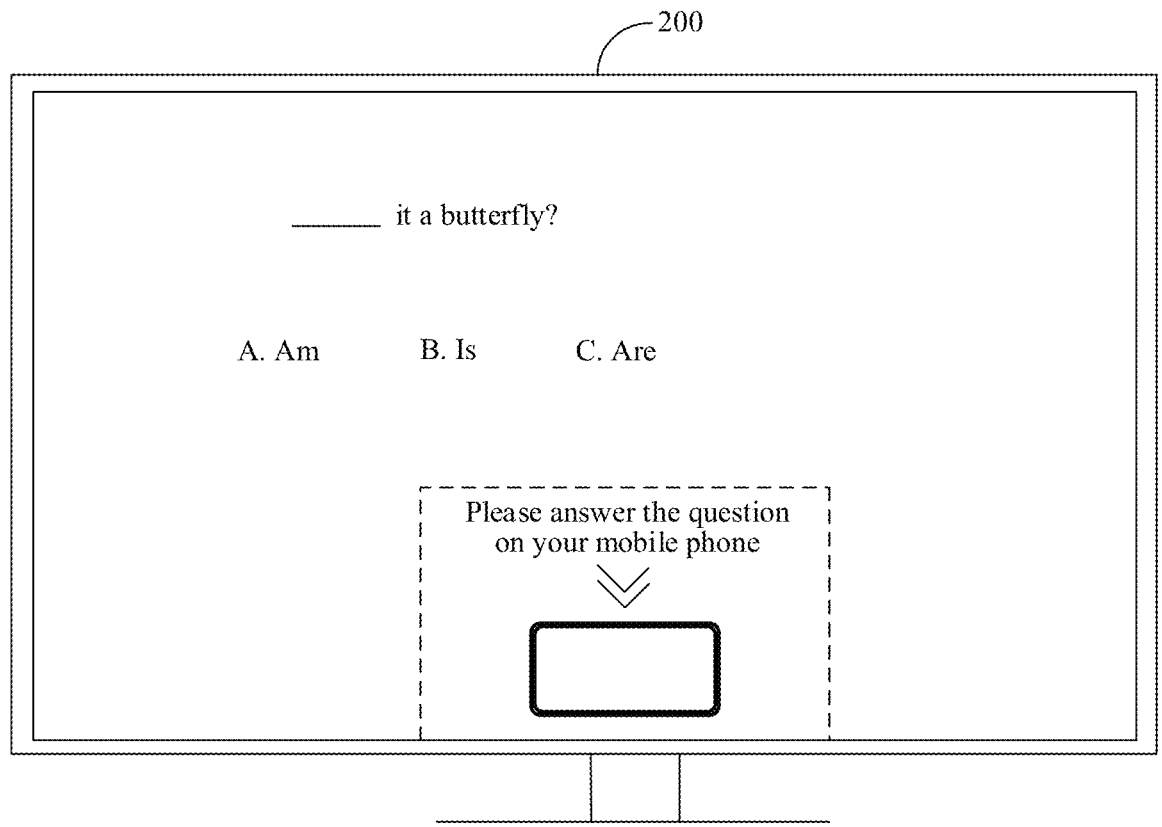
Figure 7D:
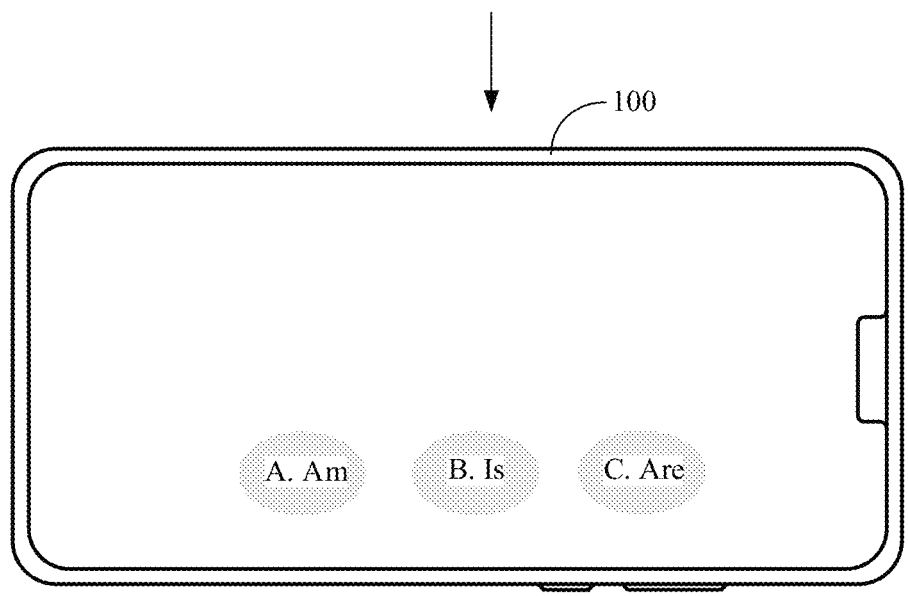
Figure 7E:
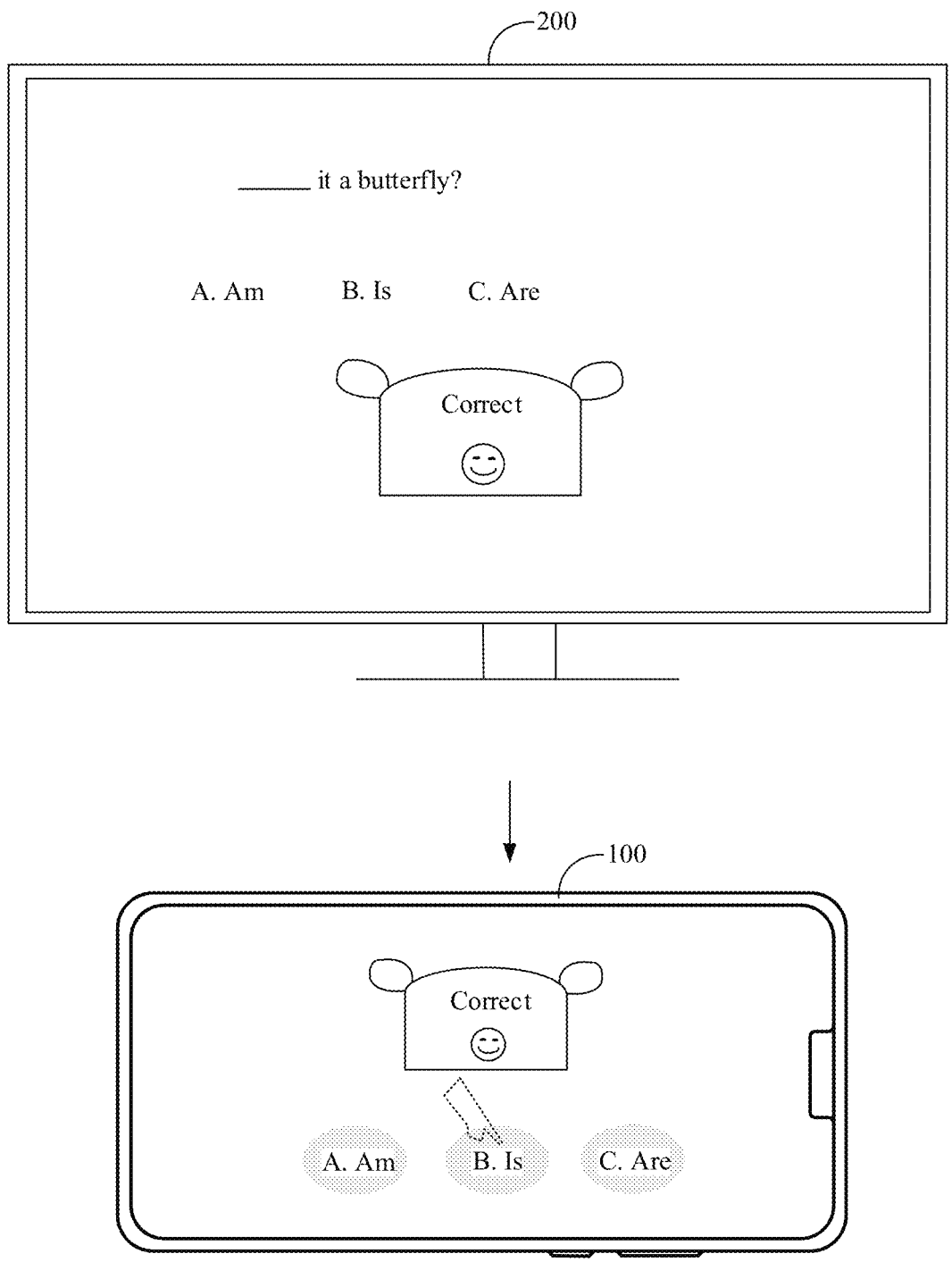
Figure 7F:
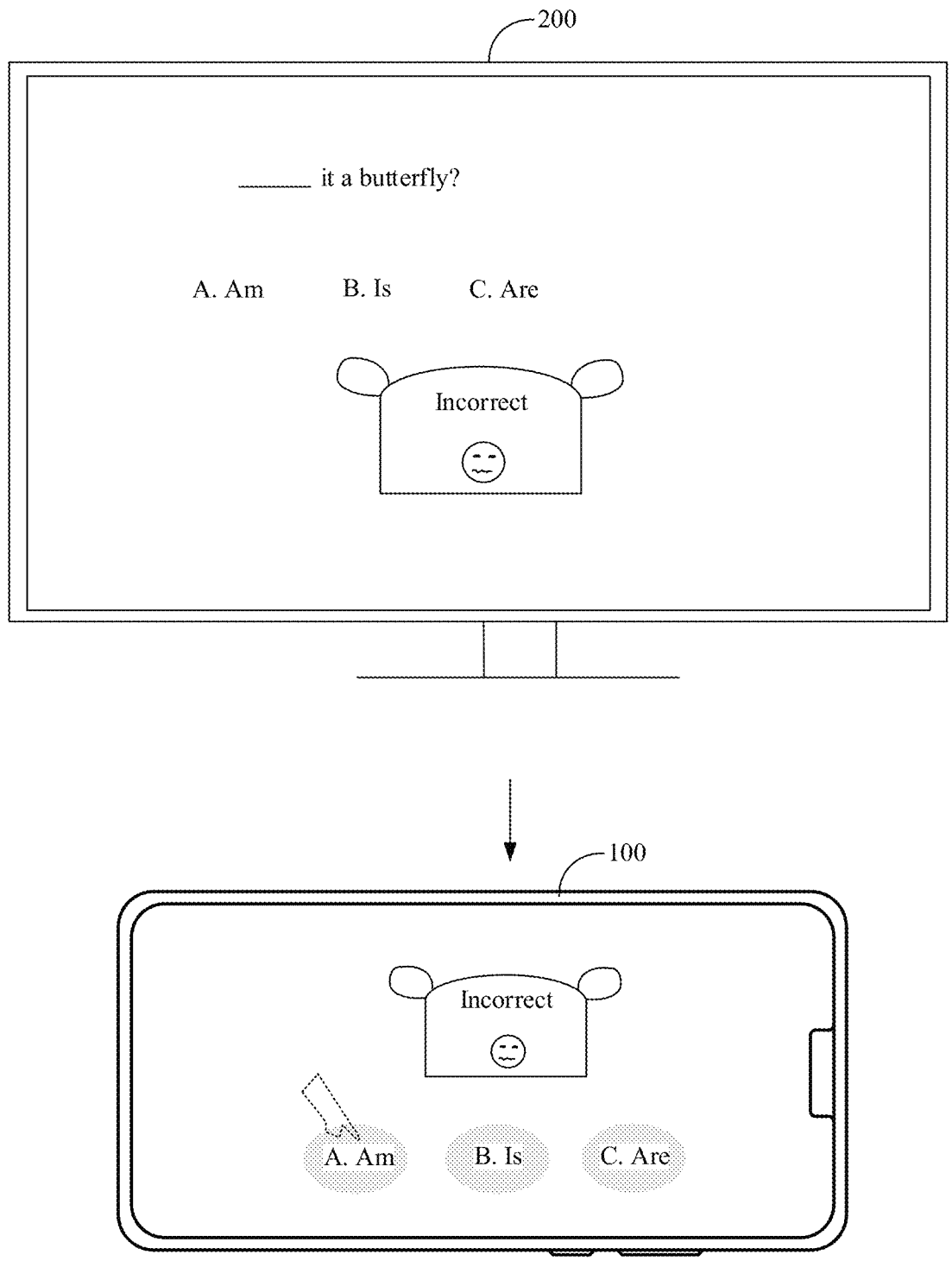

In Embodiment 1, as shown in FIG. 7a and FIG. 7f, a first electronic device 100 is a mobile phone, and a second electronic device 200 is a television. A first APP 400 is installed on the mobile phone. The first APP 400 includes a first FA 401, a first PA 402, and an interaction window 403. A second FA 404 and a second PA 405 that correspond to the first APP 400 are installed on the television. The first APP 400 may be selected based on an actual use requirement. This is not limited herein. In Embodiment 1, linkage playing between the mobile phone and the television may be implemented. The linkage playing includes but is not limited to: hopping from the mobile phone to the television for playing; controlling, by the mobile phone, a playing volume of the television; adjusting a playing progress; pausing/continuing playing; taking a screenshot of playing; hopping from the television back to the mobile phone for playing; performing a session chat at a mobile phone end; submitting a question answer; and the like. Specifically, a process in which the mobile phone and the television perform linkage playing may include the following operations.

70: The mobile phone and the television are in a same local area network. A user starts the first APP 400. The mobile phone enters an application interface to play first playing content. The user may use the first APP 400 by using a hardware module of the mobile phone, for example, photograph by using a camera of the mobile phone, play a sound by using a speaker of the mobile phone, and pick up a sound by using a microphone of the mobile phone.

71: The user selects, on the first APP 400, to hop to a large screen for playing, and selects the television as a hopping for playing device. The mobile phone sends a hopping message to notify the television.

72: The television starts the second FA 404, enters a corresponding playing progress, and continues to play the first playing content. The user may use the first APP 400 by using a hardware module of the television, for example, photograph by using a camera of the television, play a sound by using a speaker of the television, and pick up a sound by using a microphone of the television.

73: When the first playing content is successfully hopped to the television, the mobile phone exits the first FA 401. The mobile phone may further start the interaction window 403. The user may perform interaction by using the interaction window 403.

For example, the user may use the interaction window 403 to adjust a playing volume of the second FA 404, take a screenshot of playing content of the second FA 404, and stop hopping the first playing content (to be specific, hopping the first playing content back to the mobile phone for playing).

In some embodiments, when the first playing content is successfully hopped to the television for playing, the mobile phone may exit the first FA 401.

In some embodiments, when the first playing content is successfully hopped to the television for playing, the first electronic device 100 may automatically start the interaction window 403.

In some embodiments, when the first playing content is successfully hopped to the television for playing, the user may alternatively manually start the interaction window 403. Alternatively, when the first playing content is played to some specific nodes (for example, a node that requires the user to answer a question), the first electronic device automatically starts the interaction window 403.

For example, when the first playing content is played to some specific nodes, an online course service server 301 or a television may send a window starting instruction, so that the first electronic device starts the interaction window 403.

For example, when the mobile phone plays an offline course, and the mobile phone detects that the first playing content is played to some specific nodes, the mobile phone may automatically start the interaction window 403. Alternatively, when the television detects that the first playing content is played to some specific nodes, the television may send a window starting instruction to the mobile phone, and control the mobile phone to start the interaction window 403.

As shown in FIG. 7b, the user may adjust a playing volume of the second FA 404 by using the interaction window 403. The user performs a volume adjustment operation on the interaction window 403. The volume adjustment instruction is transmitted by the mobile phone to the television. The television receives the volume adjustment instruction and performs volume adjustment.

As shown in FIG. 7c, the user may use the interaction window 403 to control the television to take a screenshot. An image Image_1 generated by the television by taking a screenshot may be transmitted to the mobile phone for storage. The mobile phone may store the image in a preset area. For example, the image may be classified as a learning note. The user performs a screenshot operation on the interaction window 403. A screenshot instruction is transmitted by the mobile phone to the television. The television receives the screenshot instruction and performs the screenshot operation. The image I1 generated by the television by taking a screenshot may be transmitted to the mobile phone by using an interconnection-intercommunication protocol, a distributed soft bus, or the like.

As shown in FIG. 7d, the user may alternatively use the interaction window 403 to answer a question. For example, prompt information "Please answer the question on your mobile phone" is output in the second FA 404, and the user submits an answer by using the interaction window 403. The interaction window 403 may display a plurality of question answering options. The user may select one of the question answering options in the interaction window 403. After the user selects one question answering option by using the interaction window 403, both the interaction window 403 and the second FA 404 may output prompt information indicating whether the answer is correct. For example, as shown in FIG. 7e, if a question answering option selected by the user is a correct option, both the interaction window 403 and the second FA 404 may display prompt information "Correct". As shown in FIG. 7f, if a question answering option selected by the user is an incorrect option, both the interaction window 403 and the second FA 404 may display prompt information "Incorrect".

74: The user selects, on the mobile phone, to stop hopping to the large screen for playing. The mobile phone sends a stop message to notify the television.

75: The television exits the second FA 404.

76: The mobile phone exits the interaction window 403, and starts the first FA 401. The user continues to use the first APP 400 by using the hardware module of the mobile phone.

Embodiment 2

Figure 8:
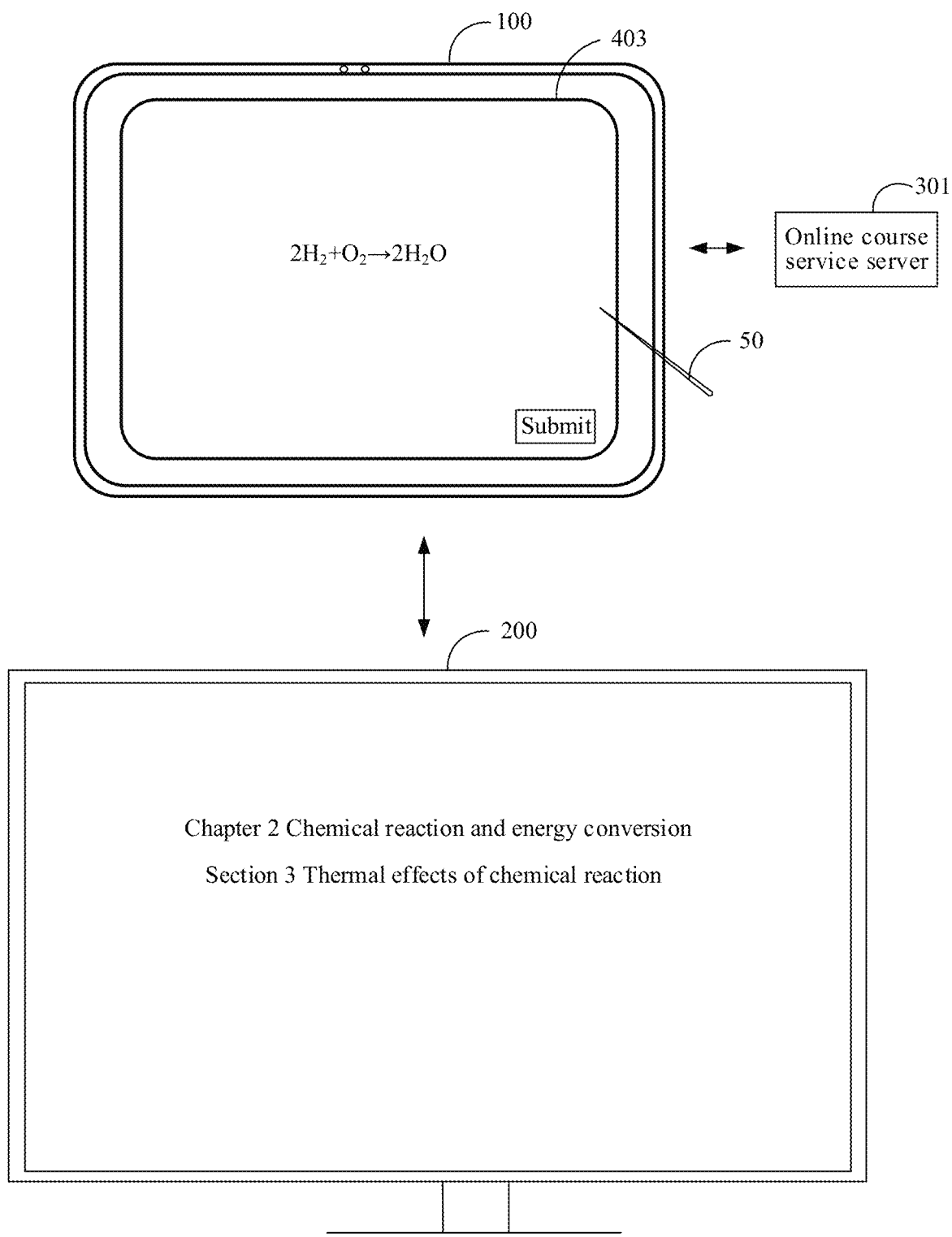
FIG. 8 is a schematic diagram of interaction between a first electronic device and a second electronic device according to still another embodiment of this application.

In Embodiment 2, as shown in FIG. 8, a first electronic device 100 is a tablet computer, and a second electronic device 200 is a television. A first APP 400 is installed on the tablet computer. The first APP 400 includes a first FA 401, a first PA 402, and an interaction window 403. A second FA 404 and a second PA 405 that correspond to the first APP 400 are installed on the television. The first APP 400 may be selected based on an actual use requirement. This is not limited herein. In Embodiment 2, linkage playing between the tablet computer and the television may be implemented. The linkage playing includes but is not limited to: hopping from the tablet computer to the television for playing; controlling, by the tablet computer, a playing volume of the television; adjusting a playing progress; pausing/continuing playing; taking a screenshot of playing; hopping from the television back to the tablet computer for playing; submitting a question answer on the tablet computer, and the like. Specifically, a process in which the tablet computer and the television perform linkage playing may include the following operations.

80: The tablet computer and the television are in a same local area network. A user starts the first APP 400. The tablet computer enters an application interface to play first playing content. The user may use the first APP 400 by using a hardware module of the tablet computer, for example, photograph by using a camera of the tablet computer, play a sound by using a speaker of the tablet computer, and pick up a sound by using a microphone of the tablet computer.

81: The user selects, on the first APP 400, to hop to a large screen for playing, and selects the television as a hopping for playing device. The tablet computer sends a hopping message to notify the television.

82: The television starts the second FA 404, enters a playing progress corresponding to playing of the tablet computer, and continues to play the first playing content. The user may use the first APP 400 by using the hardware module of the television, for example, photograph by using a camera of the television, play a sound by using a speaker of the television, and pick up a sound by using a microphone of the television.

83: When the first playing content is successfully hopped to the television, the tablet computer exits the first FA 401. The tablet computer may further start the interaction window 403. The user may perform interaction by using the interaction window 403.

For example, the user may use the interaction window 403 to adjust a playing volume of the second FA 404, take a screenshot of playing content of the second FA 404, and hop the playing content back to the tablet computer. As shown in FIG. 8, when a teacher asks what is a chemical formula for generating water, the user may alternatively use a stylus 50 to write and submit the chemical formula for generating water on the interaction window 403. The tablet computer may transmit written content on the interaction window 403 to an online course service server 301 for the teacher to view.

In some embodiments, when the first playing content is successfully hopped to the television for playing, the tablet computer exits the first FA 401. When online course content of the second FA 404 is played to some specific nodes (for example, a node that requires the user to answer a question), the tablet computer automatically starts the interaction window 403, and the user may use the interaction window 403 to perform interactive question answering.

84: The user selects, on the tablet computer, to stop hopping to the large screen for playing. The tablet computer sends a stop message to notify the television.

85: The television exits the second FA 404.

86: The tablet computer exits the interaction window 403, and starts the first FA 401. The user continues to use the first APP 400 by using the hardware module of the tablet computer.

Figure 9:
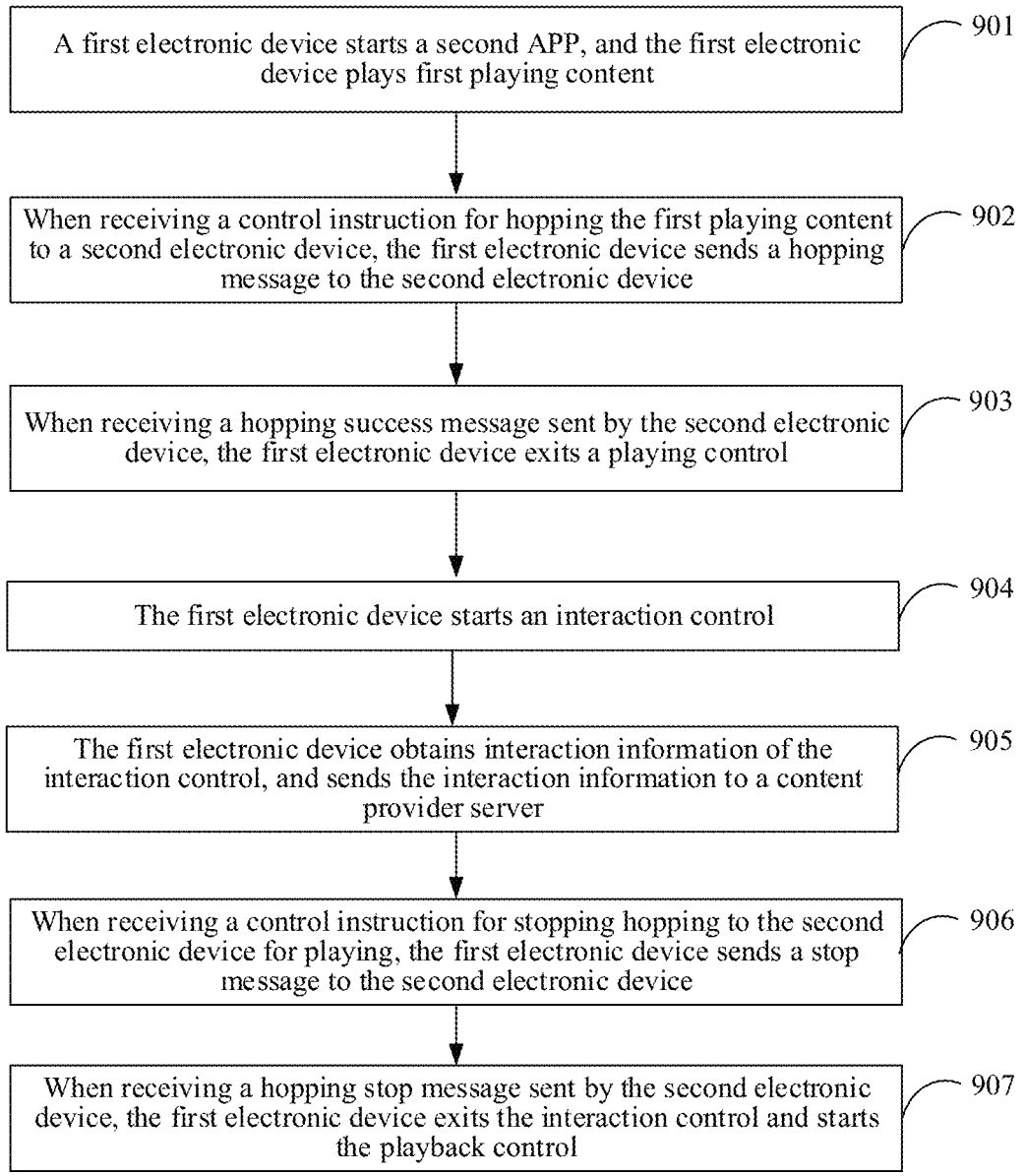
FIG. 9 is a schematic flowchart of a multi-device-based online interaction method according to an embodiment of this application.
Figure 10:
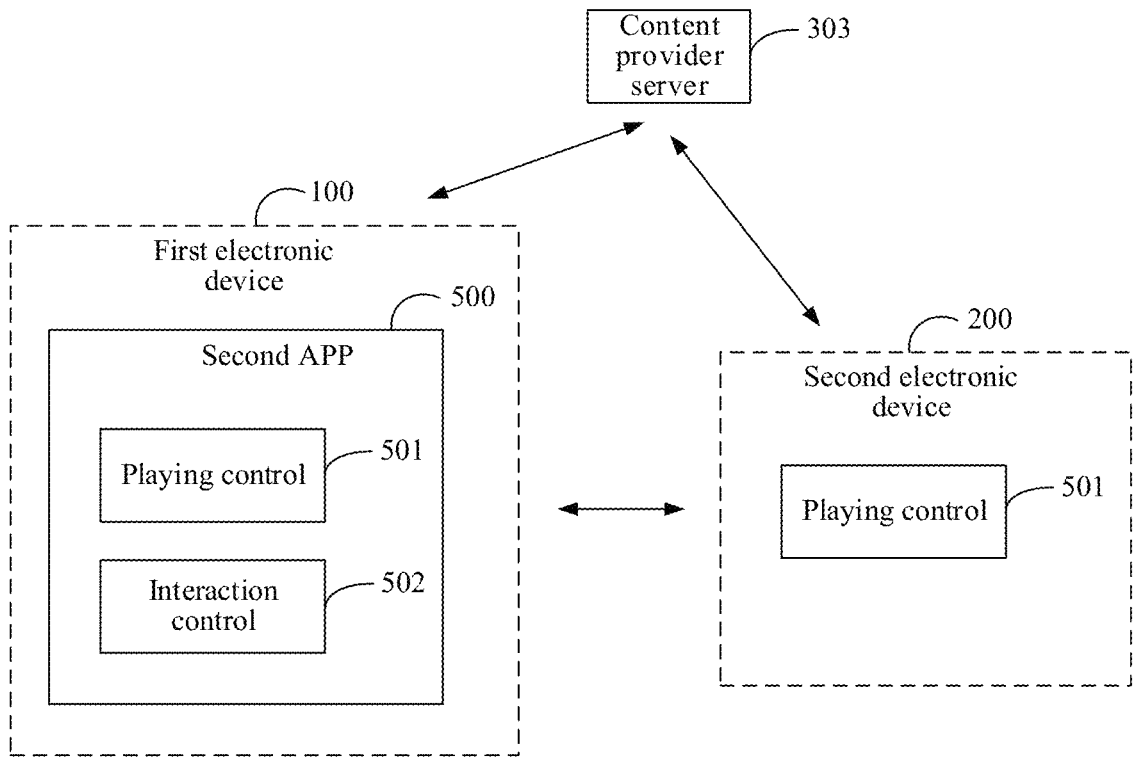
FIG. 10 is a schematic diagram of software architectures of a first electronic device and a second electronic device according to another embodiment of this application.

Refer to FIG. 9. An embodiment of this application provides a multi-device-based online interaction method, applied to a first electronic device 100. As shown in FIG. 10, a first electronic device 100 and a second electronic device 200 are located in a same local area network. Both the first electronic device 100 and the second electronic device 200 may be communicatively connected to a content provider server 303. For example, the content provider server 303 is an online course service server 301 that provides an online course service. A second APP 500 is installed on the first electronic device 100. The second APP 500 may include a playing control 501 and an interaction control 502. The playing control 501 may be a control having an image playing function. The interaction control 502 may be a control having a function of identifying user operation content and/or receiving an instruction entered by a user. The interaction control 502 may include a UI element, and may accept a touch/tap of the user. The second APP 500 may be selected based on an actual application requirement. For example, the second APP 500 is an online course learning APP. In this embodiment, the multi-device-based online interaction method includes the following operations.

901: The first electronic device 100 starts the second APP 500. The first electronic device 100 plays first playing content.

In some embodiments, when the user starts the second APP 500 on the first electronic device 100, the first electronic device 100 may enter an online course playing interface of the second APP 500. The user may perform online course learning by using a hardware module of the first electronic device 100. For example, the first electronic device 100 starts the second APP 500. The first electronic device 100 may receive the first playing content from the online course service server 301 and play the first playing content.

902: When receiving a control instruction for hopping the first playing content to the second electronic device 200, the first electronic device 100 sends a hopping message to the second electronic device 200.

In some embodiments, as shown in FIG. 4b, when the user performs a control operation on the online course playing interface, a hopping for playing icon 1107 may be invoked. As shown in FIG. 4c, when the user taps the hopping for playing icon 1107, a list 1108 of devices that can perform hopping for playing is popped up. As shown in FIG. 4d, it is assumed that the device ID 1 is the second electronic device 200. When the user selects the device ID 1 from the list 1108 of devices as a hopping for playing device, to be specific, the first electronic device 100 receives the control instruction for hopping the first playing content to the second electronic device 200, the first electronic device 100 sends the hopping message to the second electronic device 200.

903: When receiving a hopping success message sent by the second electronic device 200, the first electronic device 100 exits the playing control 501.

In some embodiments, the second electronic device 200 may also be installed with the second APP 500 or the playing control 501 of the second APP 500. As shown in FIG. 4d, when the second electronic device 200 receives the hopping message sent by the first electronic device 100, the second electronic device 200 may start the second APP 500 or the playing control 501 of the second APP 500, to continue a playing progress in the first electronic device 100 to play, that is, continue to play the first playing content. When the second APP 500 on the second electronic device 200, or the playing control 501 of the second APP 500 is started normally, or the first playing content is successfully hopped to the second electronic device 200, the second electronic device 200 may send the hopping success message to the first electronic device 100. When receiving the hopping success message sent by the second electronic device 200, the first electronic device 100 exits the playing control 501.

904: The first electronic device 100 starts the interaction control 502.

In some embodiments, when the first electronic device 100 exits the playing control 501, the first electronic device 100 may automatically start the interaction control 502, so that the user performs course interaction by using the interaction control 502.

In some embodiments, the interaction control 502 may be associated with a playing progress of the first playing content. When online course content played on the second electronic device 200 is played to some specific nodes (for example, a node that requires the user to answer a question), the first electronic device 100 may automatically start the interaction control 502. For example, that the interaction control 502 is associated with the playing progress of the first playing content may mean that the interaction control 502 is associated with a playing time node of the first playing content, or is associated with playing image content of the first playing content.

905: The first electronic device 100 obtains interaction information of the interaction control 502, and sends the interaction information to the content provider server 303.

In some embodiments, after the interaction control 502 is started, the first electronic device 100 may obtain interaction information of the user in real time, and send the interaction information to the online course service server 301. For example, the interaction information is a question answering option and question solving content. The first electronic device 100 may send the question answering option and question solving content to the online course service server 301, so that a back-end online course teacher checks a learning result, or the online course service server 301 determines whether the question answering option and question solving content are correct.

In some embodiments, when the user generates a device control instruction for the second electronic device 200 by using the interaction control 502, for example, adjusting a playing volume and a playing progress in the second electronic device 200, or controlling the second electronic device 200 to take a screenshot, the first electronic device 100 may send the device control instruction to the second electronic device 200.

906: When receiving a control instruction for stopping hopping to the second electronic device 200 for playing, the first electronic device 100 sends a stop message to the second electronic device 200.

In some embodiments, as shown in FIG. 4f, when the user taps the hopping for playing stop icon 1109, to be specific, the first electronic device 100 receives a control instruction for stopping hopping to the second electronic device 200, the first electronic device 100 sends a stop message to the second electronic device 200. When the second electronic device 200 receives the stop message sent by the first electronic device 100, the second electronic device 200 exits the second APP 500 or the playing control 501 of the second APP 500.

907: When the first electronic device 100 receives a hopping stop message sent by the second electronic device 200, the first electronic device 100 exits the interaction control 502 and starts the playing control 501.

In some embodiments, when the second electronic device 200 exits the second APP 500 or the playing control 501 of the second APP 500, the second electronic device 200 may send the hopping stop message to the first electronic device 100. When the first electronic device 100 receives the hopping stop message sent by the second electronic device 200, the first electronic device 100 exits the interaction control 502, and starts the playing control 501, to continue a playing progress in the second electronic device 200, that is, continue to play the first playing content.

In some embodiments, when the first electronic device 100 receives the hopping stop message sent by the second electronic device 200 and the interaction control 502 is not in a started state, the first electronic device 100 may start only the playing control 501, to continue the second electronic device 200 to play the first playing content.

Figure 11:
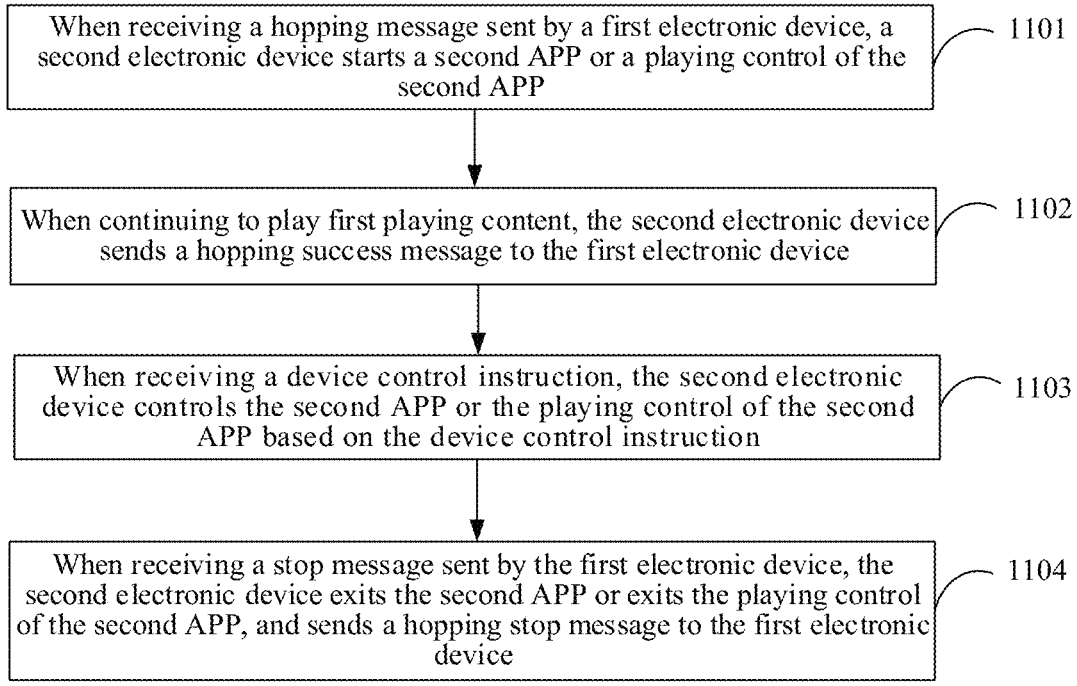
FIG. 11 is a schematic flowchart of a multi-device-based online interaction method according to another embodiment of this application.

Refer to FIG. 11. An embodiment of this application provides a multi-device-based online interaction method, applied to a second electronic device 200. The second electronic device 200 and a first electronic device 100 are in a same local area network. Both the first electronic device 100 and the second electronic device 200 may be communicatively connected to a content provider server 303. For example, the content provider server 303 is an online course service server 301. A second APP 500 is installed on the first electronic device 100. The second APP 500 may include a playing control 501 and an interaction control 502. The second APP 500 may be an online course learning type. The second electronic device 200 may be installed with a second APP 500 or a playing control 501 installed with the second APP 500. In this embodiment, the multi-device-based online interaction method includes the following operations.

1101: When receiving a hopping message sent by the first electronic device 100, the second electronic device 200 starts the second APP 500 or the playing control 501 of the second APP 500.

In some embodiments, when the second electronic device 200 receives the hopping message sent by the first electronic device 100, the second electronic device 200 may start the second APP 500 or the playing control 501 of the second APP 500, to continue a playing progress in the first electronic device 100 to play. For example, the first electronic device 100 is currently playing first playing content, and the second electronic device 200 starts the second APP 500 or the playing control 501 of the second APP 500 to continue to play the first playing content. When the second APP 500 or the playing control 501 of the second APP 500 is not pre-installed on the second electronic device 200, and when the second electronic device 200 receives the hopping message, the second electronic device 200 may download and install the second APP 500 or the playing control 501 of the second APP 500 from an application store based on an APP ID included in the hopping message, and start the second APP 500 or the playing control 501 of the second APP 500 after the installation is completed, to continue to play a playing progress in the first electronic device 100, for example, continue to play first playing content of the first electronic device 100.

1102: When continuing to play the first playing content, the second electronic device 200 sends a hopping success message to the first electronic device 100.

1103: When receiving a device control instruction, the second electronic device 200 controls the second APP 500 or the playing control 501 of the second APP 500 based on the device control instruction.

In some embodiments, when the interaction control 502 generates the device control instruction for the second electronic device 200, for example, adjusting a playing volume and a playing progress in the second electronic device 200, or controlling the second electronic device 200 to take a screenshot, the first electronic device 100 may send the device control instruction to the second electronic device 200. When receiving the device control instruction, the second electronic device 200 may control the second APP 500 or the playing control 501 of the second APP 500 based on the device control instruction, to implement volume adjustment, playing progress adjustment, screenshot, and the like.

1104: When receiving a stop message sent by the first electronic device 100, the second electronic device 200 exits the second APP 500 or exits the playing control 501 of the second APP 500, and sends a hopping stop message to the first electronic device 100.

In some embodiments, as shown in FIG. 4f, when the user taps the hopping for playing stop icon 1109, the first electronic device 100 may send the stop message to the second electronic device 200. When the second electronic device 200 receives the stop message sent by the first electronic device 100, the second electronic device 200 exits the second APP 500 or the playing control 501 of the second APP 500. When the second electronic device 200 exits the second APP 500 or the playing control 501 of the second APP 500, the second electronic device 200 may send the hopping stop message to the first electronic device 100.

Figure 12:
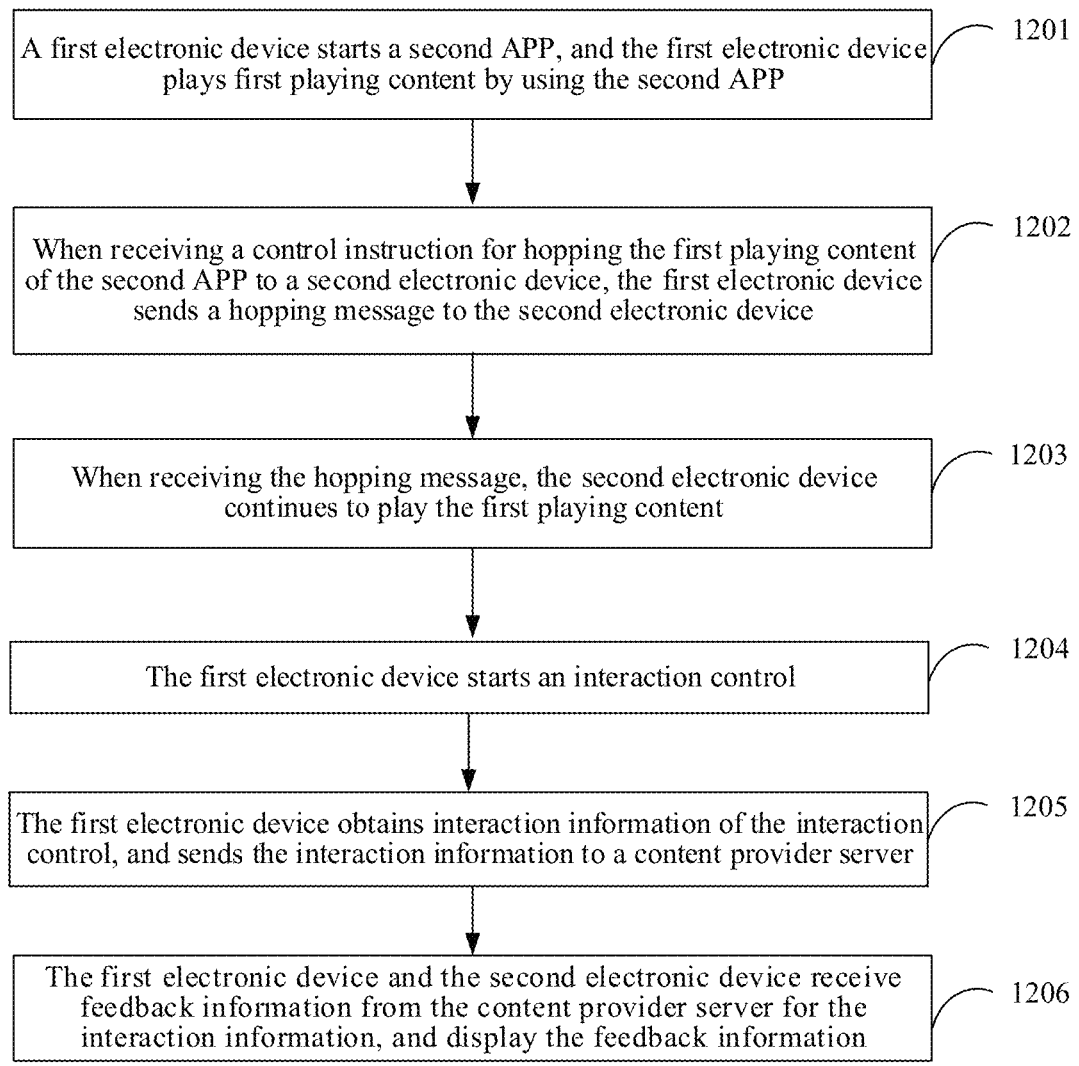
FIG. 12 is a schematic flowchart of a multi-device-based online interaction method according to still another embodiment of this application.

Refer to FIG. 12. An embodiment of this application provides a multi-device-based online interaction method, applied to a first electronic device 100 and a second electronic device 200. The first electronic device 100 and the second electronic device 200 are located in a same local area network. Both the first electronic device 100 and the second electronic device 200 may be communicatively connected to a content provider server 303. A second APP 500 is installed on the first electronic device 100. The second APP 500 may include an interaction control 502. In this embodiment, the multi-device-based online interaction method includes the following operations.

1201: The first electronic device 100 starts the second APP 500. The first electronic device 100 plays first playing content by using the second APP 500.

In some embodiments, when a user starts the second APP 500 on the first electronic device 100, the first electronic device 100 may enter a content playing interface of the second APP 500. The first electronic device 100 may receive the first playing content from the content provider server 303, and play the first playing content.

1202: When the first electronic device 100 receives a control instruction for hopping the first playing content of the second APP 500 to the second electronic device 200, the first electronic device 100 sends a hopping message to the second electronic device 200.

In some embodiments, as shown in FIG. 4b, when the user performs a control operation on the content playing interface, a hopping for playing icon 1107 may be invoked. As shown in FIG. 4c, when the user taps the hopping for playing icon 1107, a list 1108 of devices that can perform hopping for playing is popped up. As shown in FIG. 4d, it is assumed that the device ID 1 is the second electronic device 200. When the user selects the device ID 1 from the list 1108 of devices as a hopping for playing device, to be specific, the first electronic device 100 receives the control instruction for hopping the first playing content to the second electronic device 200, the first electronic device 100 sends the hopping message to the second electronic device 200.

1203: When the second electronic device 200 receives the hopping message, the second electronic device 200 continues to play the first playing content.

In some embodiments, when the second electronic device 200 receives the hopping message sent by the first electronic device 100, the second electronic device 200 may continue to play the first playing content, to be specific, continue a playing progress in the first electronic device 100 to play.

1204: The first electronic device 100 starts the interaction control 502.

In some embodiments, when the first playing content is successfully hopped to the second electronic device 200 for playing, the first electronic device 100 may automatically start the interaction control 502, so that the user performs interaction by using the interaction control 502.

In some embodiments, when the first playing content played on the second electronic device 200 is played to some specific nodes (for example, a node that requires the user to answer a question), the first electronic device 100 may automatically start the interaction control 502.

In some embodiments, when the first electronic device 100 starts the interaction control 502, the second electronic device 200 may display prompt information associated with the interaction control 502, to remind the user to perform an interaction operation on the interaction control 502. For example, the first electronic device 100 is a mobile phone, and the interaction control 502 is a question answering interface. When the interaction control 502 is started, the second electronic device 200 may display prompt information "Please answer the question on your mobile phone", and the prompt information may stop being displayed when the user submits a question answer.

1205: The first electronic device 100 obtains interaction information of the interaction control 502, and sends the interaction information to the content provider server 303.

In some embodiments, after the interaction control 502 is started, the first electronic device 100 may obtain interaction information of the user in real time, and send the interaction information to the content provider server 303.

In some embodiments, when the user generates a device control instruction for the second electronic device 200 by using the interaction control 502, for example, adjusting a playing volume and a playing progress in the second electronic device 200, or controlling the second electronic device 200 to take a screenshot, the first electronic device 100 may send the device control instruction to the second electronic device 200.

1206: The first electronic device 100 and the second electronic device 200 receive feedback information from the content provider server 303 for the interaction information, and display the feedback information.

In some embodiments, when receiving the interaction information sent by the first electronic device 100, the content provider server 303 may output corresponding feedback information based on the interaction information. The content provider server 303 may separately send the feedback information to the first electronic device 100 and the second electronic device 200, so that both the first electronic device 100 and the second electronic device 200 can display the feedback information. For example, when the user answers a question by using the interaction control 502, if a question answering option selected by the user is a correct option, both the first electronic device 100 and the second electronic device 200 may display prompt information "Correct". Alternatively, if a question answering option selected by the user is an incorrect option, both the first electronic device 100 and the second electronic device 200 may display prompt information "Incorrect".

Figure 13:
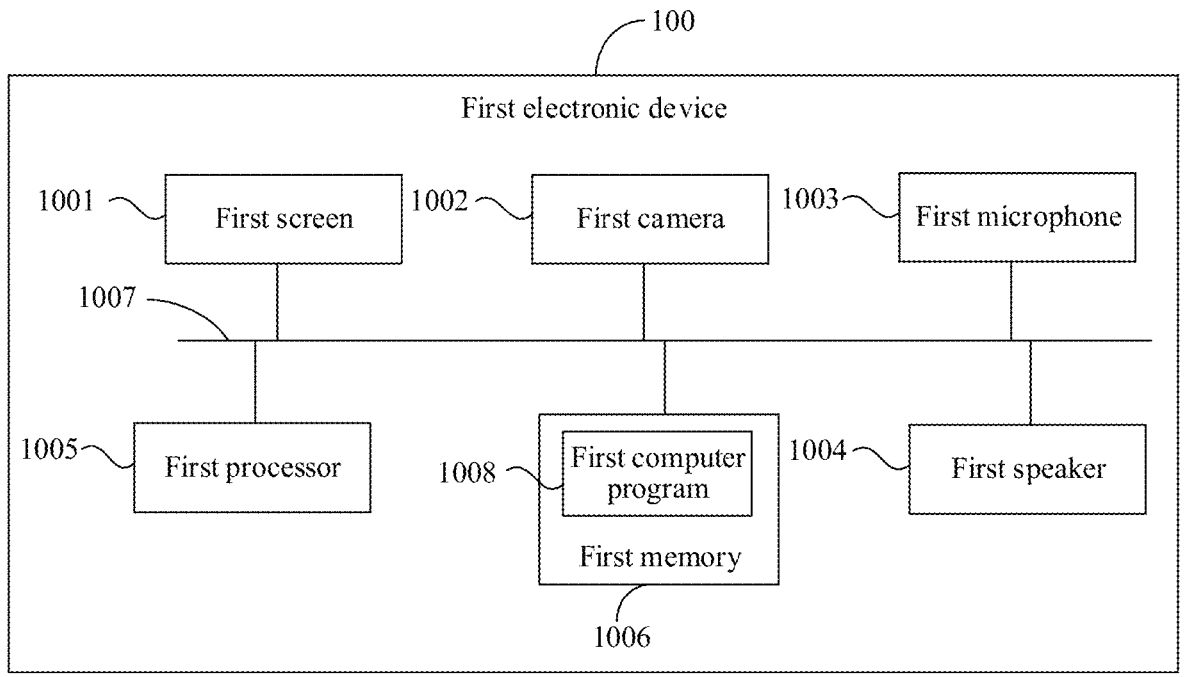
FIG. 13 is a schematic diagram of a possible structure of a first electronic device according to an embodiment of this application.

FIG. 13 is a schematic diagram of a structure of hardware of a first electronic device 100 according to an embodiment of this application. As shown in FIG. 13, the first electronic device 100 may include a first screen 1001, a first camera 1002, a first microphone 1003, a first speaker 1004, a first processor 1005, a first memory 1006, and a first communication bus 1007. The first memory 1006 is configured to store one or more first computer programs 1008. The one or more first computer programs 1008 are configured to be executed by the first processor 1005. The one or more first computer programs 1008 include instructions. The instructions may be for implementing the multi-device-based online interaction method shown in FIG. 9 in the first electronic device 10.

It may be understood that the structure shown in this embodiment does not constitute a specific limitation on the first electronic device 100. In some other embodiments, the first electronic device 100 may include more or fewer components than those shown in the figure, or combine some components, or split some components, or have different component arrangements.

Figure 14:
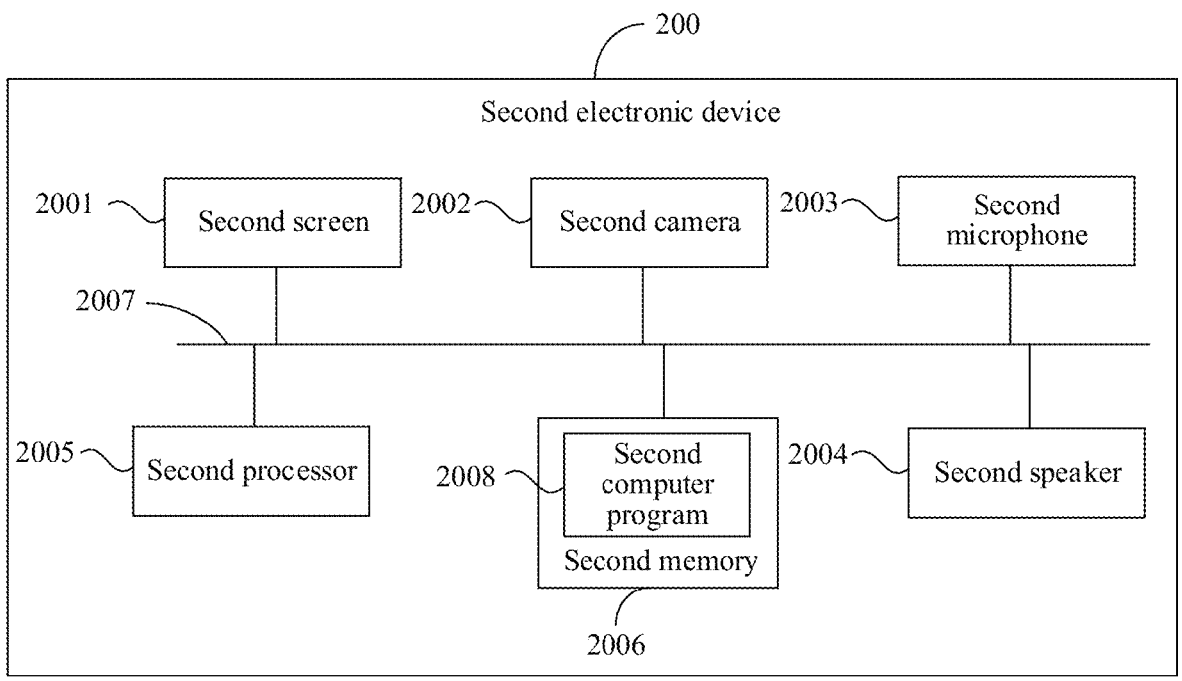
FIG. 14 is a schematic diagram of a possible structure of a second electronic device according to an embodiment of this application.

FIG. 14 is a schematic diagram of a structure of hardware of a second electronic device 200 according to an embodiment of this application. As shown in FIG. 14, the second electronic device 200 may include a second screen 2001, a second camera 2002, a second microphone 2003, a second speaker 2004, a second processor 2005, a second memory 2006, and a second communication bus 2007. The second memory 2006 is configured to store one or more second computer programs 2008. The one or more second computer programs 2008 are configured to be executed by the second processor 2005. The one or more second computer programs 2008 include instructions. The instructions may be for implementing the multi-device-based online interaction method shown in FIG. 11 in the second electronic device 200.

It may be understood that the structure shown in this embodiment does not constitute a specific limitation on the second electronic device 200. In some other embodiments, the second electronic device 200 may include more or fewer components than those shown in the figure, or combine some components, or split some components, or have different component arrangements.

The first processor 1005 and the second processor 2005 may both include one or more processing units. For example, the first processor 1005 may include an application processor (AP), a modem processor, a graphics processing unit (GPU), an image signal processor (ISP), a controller, a video codec, a digital signal processor (DSP), a baseband processor, a neural network processing unit (NPU), and/or the like. Different processing units may be independent components, or may be integrated into one or more processors.

Both the first processor 1005 and the second processor 2005 may be further provided with memories, configured to store the instructions and data. In some embodiments, the memories in the first processor 1005 and the second processor 2005 are caches. The memories may store instructions or data, just used or cyclically used by the first processor 1005 (the second processor 2005). If the first processor 1005 (the second processor 2005) needs to use the instructions or data again, the first processor 1005 (the second processor 2005) may directly invoke the instructions or data from the memories. Repeated access is avoided, and waiting time of the first processor 1005 (the second processor 2005) is reduced, thereby improving system efficiency.

In some embodiments, both the first processor 1005 and the second processor 2005 may include one or more interfaces. The interface may include an inter-integrated circuit (I2C) interface, an inter-integrated circuit sound (I2S) interface, a pulse code modulation (PCM) interface, and a universal asynchronous receiver/transmitter (UART) interface, a mobile industry processor interface (MIPI), a general-purpose input/output (GPIO) interface, a SIM interface, a USB port, and/or the like.

In some embodiments, both the first memory 1006 and the second memory 2006 may include a high-speed random access memory, and may further include a non-volatile memory, for example, a hard disk, a memory, and a plug-in hard disk, a smart memory card (SMC), a secure digital (SD) card, a flash card, at least one magnetic disk storage component, a flash memory component, or another volatile solid-state storage component.

This embodiment further provides a computer storage medium. The computer storage medium stores computer instructions. When the computer instructions are run on an electronic device, the electronic device performs the foregoing related operations to implement the multi-device-based online interaction method in the foregoing embodiments.

This embodiment further provides a computer program product. When the computer program product runs on a computer, the computer is enabled to perform the foregoing related operations to implement the multi-device-based online interaction method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the multi-device-based online interaction method in the foregoing method embodiments.

The first electronic device, the second electronic device, the computer storage medium, the computer program product, or the chip provided in this embodiment is configured to perform the corresponding methods provided above. Therefore, for beneficial effects that can be achieved by the first electronic device, the second electronic device, the computer storage medium, the computer program product, or the chip, refer to the beneficial effects in the corresponding methods provided above. Details are not described herein again.

Based on descriptions of the foregoing embodiments, a person skilled in the art may clearly understand that, for the purpose of convenient and brief description, division of the foregoing functional modules is merely used as an example for description. During actual application, the foregoing functions may be allocated to different functional modules for implementation based on a requirement. In other words, an internal structure of an apparatus is divided into different functional modules to implement all or some of the functions described above.

In embodiments provided in this application, it should be understood that the disclosed apparatuses and methods may be implemented in another manner. For example, the apparatus embodiment described above is merely an example. For example, division of the modules or units is merely logical function division, and may be another division in actual implementation. For example, a plurality of units or components may be combined or integrated into another apparatus, or some features may be ignored or not performed. In addition, the displayed or discussed mutual couplings or direct couplings or communication connections may be through some interfaces, and indirect couplings or communication connections of the apparatuses or units may be in an electrical, a mechanical, or another form.

The units described as separate parts may or may not be physically separate, and the parts displayed as units may be one physical unit or a plurality of physical units, in other words, may be located in one place, or may be distributed in a plurality of different places. Some or all of the units may be selected based on an actual requirement to achieve the objectives of the solutions in the embodiments.

In addition, functional units in embodiments of this application may be integrated into one processing unit, or each unit may exist alone physically, or two or more units may be integrated into one unit. The foregoing integrated unit may be implemented in a form of hardware, or may be implemented in a form of a software functional unit.

If the integrated unit is implemented in the form of the software functional unit, and sold or used as an independent product, the integrated unit may be stored in a computer-readable storage medium. Based on such an understanding, the technical solutions in embodiments of this application essentially, or a part that makes contributions to the conventional technology, or all or some of the technical solutions, may be embodied in a form of a software product. The software product is stored in a storage medium, and includes several instructions for enabling a device (which may be a single-chip microcomputer, a chip, or the like) or a processor to perform all or some of the operations of the methods described in embodiments of this application. The foregoing storage medium includes media such as a USB flash drive, a removable hard disk, a read-only memory (ROM), a random access memory (RAM), a magnetic disk, an optical disc, or the like, that can store program code.

The foregoing descriptions are merely specific embodiments of this application, but are not intended to limit the protection scope of this application. Any variation or replacement within the technical scope disclosed in this application shall fall within the protection scope of this application.

What is claimed is:

1. A multi-device-based online interaction method, comprising:
   starting, by a first electronic device, a first application;
   playing, by the first electronic device, first playing content by using the first application;
   in response to that the first electronic device receives a control instruction for hopping the first playing content of the first application to a second electronic device, sending, by the first electronic device to the second electronic device, a hopping message to enable the second electronic device to continue to play the first playing content;
   receiving, by the first electronic device from a content provider server, a control starting instruction;
   in response to receiving the control starting instruction, starting, by the first electronic device, an interaction control having a function of identifying user operation content and/or receiving an instruction entered by a user;
   obtaining, by the first electronic device, interaction information of the interaction control;
   sending, to the content provider server, the interaction information;
   receiving, by the first electronic device from the content provider server, feedback information for the interaction information;
   displaying, by the first electronic device, the feedback information for the interaction information, wherein the feedback information for the interaction information is received by the second electronic device from the content provider server and displayed by the second electronic device.

2. The multi-device-based online interaction method according to claim 1, further comprising:
   in response to that the first electronic device receives, from the second electronic device, a hopping success message, stopping, by the first electronic device, playing the first playing content.

3. The multi-device-based online interaction method according to claim 1, further comprising:
   in response to that the first electronic device receives a control instruction for stopping hopping the first playing content, sending, by the first electronic device to the second electronic device, a stop message.

4. The multi-device-based online interaction method according to claim 3, further comprising:
   in response to that the first electronic device receives, from the second electronic device, a hopping stop message, continuing, by the first electronic device, to play the first playing content.

5. The multi-device-based online interaction method according to claim 1, further comprising:
   sending, by the first electronic device, a device control instruction to the second electronic device, to control the second electronic device to perform a preset function.

6. The multi-device-based online interaction method according to claim 5, wherein the first electronic device comprises a first distributed soft bus, wherein the second electronic device comprises a second distributed soft bus, and wherein the sending the device control instruction to the second electronic device comprises:
   sending, by the first electronic device, the device control instruction to the second electronic device by using the first distributed soft bus and the second distributed soft bus.

7. The multi-device-based online interaction method according to claim 5, wherein the device control instruction is a screenshot instruction, and the method further comprising:
   receiving, by the first electronic device from the second electronic device, a screenshot image sent; and
   storing the screenshot image.

8. The multi-device-based online interaction method according to claim 1, wherein the interaction control is associated with a playing progress of the first playing content.

9. A multi-device-based online interaction method, comprising:
   starting, by a first electronic device, a first application;
   playing, by the first electronic device, first playing content by using the first application;

in response to that the first electronic device receives a control instruction for hopping the first playing content of the first application to a second electronic device, sending, by the first electronic device to the second electronic device, a hopping message;

in response to that the second electronic device receives the hopping message, continuing, by the second electronic device, to play the first playing content;

starting, by the first electronic device, an interaction control having a function of identifying user operation content and/or receiving an instruction entered by a user;

obtaining, by the first electronic device, interaction information of the interaction control;

sending the interaction information to a content provider server;

receiving, by the first electronic device from the content provider server, feedback information for the interaction information;

displaying, by the first electronic device, the feedback information;

receiving, by the second electronic device from the content provider server, the feedback information for the interaction information; and displaying, by the second electronic device, the feedback information.

10. The multi-device-based online interaction method according to claim 9, further comprising:
in response to that the second electronic device continues to play the first playing content, sending, by the second electronic device, a hopping success message to the first electronic device; and
in response to that the first electronic device receives the hopping success message, stopping, by the first electronic device, playing the first playing content.

11. The multi-device-based online interaction method according to claim 9, further comprising:
in response to that the first electronic device receives a control instruction for stopping hopping the first playing content, sending, by the first electronic device, a stop message to the second electronic device; and
in response to that the second electronic device receives the stop message, stopping, by the second electronic device, playing the first playing content.

12. The multi-device-based online interaction method according to claim 11, further comprising:
in response to that the second electronic device stops playing the first playing content, sending, by the second electronic device, a hopping stop message to the first electronic device; and
in response to that the first electronic device receives the hopping stop message, continuing, by the first electronic device, to play the first playing content.

13. The multi-device-based online interaction method according to claim 9, further comprising:
sending, by the first electronic device, a device control instruction to the second electronic device; and
performing, by the second electronic device, a preset function based on the device control instruction.

14. The multi-device-based online interaction method according to claim 13, wherein the first electronic device comprises a first distributed soft bus, wherein the second electronic device comprises a second distributed soft bus, and wherein the sending the device control instruction to the second electronic device comprises:

sending, by the first electronic device, the device control instruction to the second electronic device by using the first distributed soft bus and the second distributed soft bus.

15. The multi-device-based online interaction method according to claim 13, wherein the device control instruction is a screenshot instruction, the method further comprising:
sending, by the second electronic device to the first electronic device, a screenshot image; and
receiving and storing, by the first electronic device, the screenshot image.

16. The multi-device-based online interaction method according to claim 9, wherein the starting, by the first electronic device, the interaction control comprises:
receiving, by the first electronic device from the content provider server, a control starting instruction; and
in response to the control starting instruction, starting, by the first electronic device, the interaction control.

17. The multi-device-based online interaction method according to claim 9, wherein the interaction control is associated with a playing progress of the first playing content.

18. The multi-device-based online interaction method according to claim 9, further comprising:
in response to that the interaction control is started, displaying, by the second electronic device, prompt information associated with the interaction control.

19. An electronic device, wherein the electronic device comprises a processor and a memory, the memory is configured to store instructions, and the processor is configured to invoke the instructions in the memory, to cause the electronic device to:
start a first application;
play first playing content by using the first application;
in response to that the electronic device receives a control instruction for hopping the first playing content of the first application to another electronic device, send a hopping message to the another electronic device, to enable the another electronic device to continue to play the first playing content;
receive, from a content provider server, a control starting instruction;
in response to receiving the control starting instruction, start an interaction control having a function of identifying user operation content and/or receiving an instruction entered by a user; and
obtain interaction information of the interaction control;
send the interaction information to the content provider server;
receive feedback information for the interaction information;
display the feedback information for the interaction information, wherein the feedback information for the interaction information is received by the another electronic device from the content provider server and displayed by the another electronic device.

20. The electronic device according to claim 19, wherein the processor is configured to invoke the instructions in the memory, to further cause the electronic device to:
in response to that the electronic device receives a control instruction for stopping hopping the first playing content, send, by the electronic device to the another electronic device, a stop message.

21. The electronic device according to claim 19, wherein the processor is configured to invoke the instructions in the memory, to further cause the electronic device to:

in response to that the electronic device receives, from the another electronic device, a hopping stop message, continue, by the electronic device, to play the first playing content.

\* \* \* \* \*